(12) United States Patent
Kobayashi et al.

(10) Patent No.: US 6,781,666 B2
(45) Date of Patent: Aug. 24, 2004

(54) LIQUID CRYSTAL DISPLAY AND METHOD TO MANUFACTURE THE SAME

(75) Inventors: Nobuyuki Kobayashi, Kobe (JP); Masako Iwamatsu, Toyonaka (JP); Hideaki Ueda, Kishiwada (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 10/452,369

(22) Filed: Jun. 2, 2003

(65) Prior Publication Data

US 2003/0206260 A1 Nov. 6, 2003

Related U.S. Application Data

(62) Division of application No. 09/613,380, filed on Jul. 11, 2000.

(30) Foreign Application Priority Data

| Jul. 16, 1999 | (JP) | ............................................ 11-203518 |
| Jul. 16, 1999 | (JP) | ............................................ 11-203519 |
| Jul. 16, 1999 | (JP) | ............................................ 11-203520 |

(51) Int. Cl.[7] .................... G02F 1/1347; C09K 19/02
(52) U.S. Cl. .................... 349/185; 349/74; 349/175
(58) Field of Search .................... 349/74, 175, 185

(56) References Cited

U.S. PATENT DOCUMENTS

| 3,645,604 A | 2/1972 | Ngo ............................ 350/160 |
| 4,549,174 A | 10/1985 | Funada et al. .............. 340/784 |
| 4,832,461 A | 5/1989 | Yamagishi et al. ...... 350/347 E |
| 5,179,459 A | 1/1993 | Plesinger ....................... 359/74 |
| 5,545,280 A | 8/1996 | Wenz ............................ 156/234 |
| 5,566,010 A | 10/1996 | Ishii et al. ..................... 359/59 |
| 5,680,184 A | 10/1997 | Nishino ......................... 349/78 |
| 5,680,185 A | 10/1997 | Kobayashi et al. ............. 349/88 |
| 5,796,447 A | 8/1998 | Okumura et al. .............. 349/33 |
| 5,875,012 A | 2/1999 | Crawford et al. .............. 349/74 |
| 6,033,742 A | 3/2000 | Iwanaga et al. ................ 428/1 |
| 6,278,505 B1 * | 8/2001 | Okada et al. .................. 349/78 |
| 2002/0171789 A1 * | 11/2002 | Ueda et al. .................. 349/106 |

FOREIGN PATENT DOCUMENTS

| JP | 357201218 A | * 12/1982 |
| JP | 09-160066 A | 6/1997 |
| JP | 11-064895 A | 3/1999 |

OTHER PUBLICATIONS

Huang et al., "Full Color Reflective Cholesteric Liquid Crystal Display", *SPIE, vol. 3635, Jan., 1999*, pp. 120–126.

* cited by examiner

*Primary Examiner*—Toan Ton
*Assistant Examiner*—Hoan Nguyen
(74) *Attorney, Agent, or Firm*—Sidley Austin Brown & Wood LLP

(57) ABSTRACT

Disclosed is a liquid crystal display having stacked liquid crystal light modulation layers each containing a liquid crystal compound. At least one of the liquid crystal modulation layers is different from remaining ones in at least one of a dielectric anisotropy, a thickness, a liquid crystal compound contained therein, and a functional layer provided therein so that the drive voltage ranges for the layers are made equal.

40 Claims, 6 Drawing Sheets

LIQUID CRYSTAL DISPLAY AND METHOD TO MANUFACTURE THE SAME

CROSS REFERENCE TO RELATED APPLICATIONS

This application is a divisional of co-pending U.S. patent application Ser. No. 09/613,380, filed Jul. 11, 2000, hereby incorporated by reference, which is based on Japanese Patent Applications Nos. HEI 11-203518, HEI 11-203519, and HEI 11-203520, filed on Jul. 16, 1999 in Japan, the entire contents of which are hereby incorporated by reference.

BACKGROUND OF THE INVENTION

1. Field of the Invention

The present invention pertains to a liquid crystal display, and more particularly to a liquid crystal display comprising multiple cells stacked together and the manufacturing method therefor.

2. Description of the Related Art

Research and development of displays using liquid crystal has been actively pursued in recent years. In particular, displays using a chiral nematic liquid crystal composition, which exhibits a cholestric phase at room temperature and which is obtained by adding a chiral agent to nematic liquid crystal, as well as guest-host type displays using nematic liquid crystal to which a dichroic pigment is added, have been drawing attention.

In a liquid crystal display including a liquid crystal composition that exhibits a cholesteric phase, display is performed by switching the liquid crystal back and forth between a planar state (selective reflection state) and a focal conic state (light scattering state) by applying a high or low pulse voltage. Where a material comprising liquid crystal to which a multichroic pigment—such as a dichroic pigment—is added is used for the liquid crystal composition, display is performed by changing the direction of the axes of the liquid crystal molecules when voltage is applied and when voltage is not applied, so that the display alternates between a colored state and a non-colored state.

One method to realize multi-color image display on the displays described above involves a construction in which three cells, which display red (R), green (G) and blue (B), respectively, are stacked. In this case, drive ICs that apply different voltages to the three cells, which display R, G and B, respectively, are needed, resulting in the problem of increased cost. Therefore, a liquid crystal display that has a layered construction having display and drive characteristics appropriate for practical use is not yet available.

SUMMARY OF THE INVENTION

The main object of the present invention is to provide an improved liquid crystal display having a that has a layered construction.

Another object of the present invention is to provide a liquid crystal display that is capable of displaying high-quality images.

Still another object of the present invention is to provide a liquid crystal display that is easy to control.

Yet another object of the present invention is to provide a liquid crystal display in which the stacked cells can be driven using a few types of drive ICs so that the cost can be reduced, as well as a method for manufacturing such a liquid crystal display.

To attain at least one of the objects identified above, the liquid crystal display reflecting a first aspect of the present invention comprises a plurality of liquid crystal light modulation layers stacked together, each of said liquid crystal light modulation layers including a liquid crystal composition comprising a liquid crystal compound, wherein at least two of said liquid crystal light modulation layers are substantially have essentially identical maximum drive voltages.

By including at least two liquid crystal light modulation layers that have essentially identical maximum drive voltages, the liquid crystal display can be driven using a few types of drive ICs and its cost may can reduced.

The maximum drive voltages for all of the liquid crystal light modulation layers may be made identical. In this way, the liquid crystal display can be driven using a smaller number of types of drive ICs, which leads to a further reduction in cost.

Moreover, by making the maximum drive voltages for at least two liquid crystal light modulation layers substantially identical, the ranges of drive voltage for these liquid crystal light modulation layers can be made substantially the same, which makes drive control easy.

It is preferred that each liquid crystal light modulation layer be held between a pair of substrates, and that one of the substrates in the pair have scanning electrodes while the other has signal electrodes. The scanning electrodes of at least two liquid crystal light modulation layers may be electrically connected. By electrically connecting the scanning electrodes, the construction of the drive circuit can be simplified.

The same type of signal drive IC may be used for the signal electrodes of at least two liquid crystal light modulation layers. In this way, the construction of the drive circuit can be simplified.

At least one of the substrates may be pliable. By using pliable substrates, the liquid crystal display may be made flexible. In particular, if resin film substrates are used, the liquid crystal display may be made lightweight.

Resin structures may be placed in the light modulation area between the pair of substrates that holds each liquid crystal light modulation layer. By placing resin structures in this way, the distance between the substrates may be accurately maintained and the thickness of the liquid crystal layer may be made uniform. In addition, the substrate distance may be maintained well even if pliable substrates are used, and it is easy to increase the size of the liquid crystal display.

Each liquid crystal light modulation layer may comprise a composite film in which the liquid crystal composition is dispersed in a high-polymer matrix. In this way, the size of the liquid crystal display can be easily increased and a good angle of visibility can be obtained.

The liquid crystal composition may be one that exhibits a cholesteric phase at room temperature. In this case, the liquid crystal display may comprises, as the light modulation layers, three layers, i.e., a liquid crystal layer for blue color that displays blue, a liquid crystal layer for green color that displays green, and a liquid crystal layer for red color that displays red, stacked in that order from the light receiving side (the viewing side).

Each liquid crystal light modulation layer may comprise one that performs display based on the guest-host effect. This type of display can be realized by using a liquid crystal composition comprising nematic liquid crystal to which a multichroic pigment is added as an additive, for example. In this case, by controlling the orientation of the pigment molecules by changing the liquid crystal molecular alignment, the liquid crystal layer may be alternated between a colored state and a non-colored state.

Each liquid crystal light modulation layer may include functional films such as an insulating film and/or an orientation control film, in addition to the liquid crystal layer including the liquid crystal composition. In this case, the maximum drive voltages for at least two liquid crystal light modulation layers may be made substantially identical by adjusting the thickness of the functional films.

In a second aspect of the present invention, a manufacturing method for a liquid crystal display containing a plurality of liquid crystal light modulation layers stacked together, each of said liquid crystal light modulation layers including a liquid, crystal composition comprising a liquid crystal compound, the manufacturing method comprises a step of substantially equalizing maximum drive voltages of at least two of said liquid crystal light modulation layers by adjusting at least one of the following factors:

a thickness of each of said liquid crystal layers contained in the at least two liquid crystal light modulation layers;

a kind of at least one component of each of the liquid crystal compositions included in the at least two liquid crystal light modulation layers;

a dielectric anisotropy of each of the liquid crystal compositions included in the at least two liquid crystal light modulation layers; and a thickness of each of functional films provided in the at least two liquid crystal light modulation layers.

By appropriately designing at least one of the above mentioned factors, the maximum drive voltages of the at least two liquid crystal layers can be easily made identical, such that the liquid crystal display can be driven using a small number of types of drive ICs, and its cost may be reduced.

According to a third aspect of the present invention, a liquid crystal display comprising a plurality of liquid crystal light modulation layers stacked together, each of said liquid crystal light modulation layers including a liquid crystal layer comprising a liquid crystal composition, wherein at least one of said liquid crystal layers has a thickness different from those of the remaining ones of the liquid crystal layers.

In this liquid crystal display, by making the thickness of the at least one liquid crystal layer different from those of the remaining ones of the liquid crystal layers, the variations in the range of drive voltage that are caused by the fact that the liquid crystal layers are adjusted to modulate light of specific wavelength ranges different each other can be eliminated.

It is preferred that the liquid crystal layers include a pair of liquid crystal layers that have different thicknesses and in which the dielectric anisotropy of the liquid crystal composition in the thicker layer is larger than that in the thinner layer. Because less voltage is required to perform alternation of the liquid crystal layer between a colored state and a non-colored state as the dielectric anisotropy increases, by using this construction, the variations among the liquid crystal layers in terms of the drive voltage range may be accurately eliminated.

The liquid crystal composition included in the liquid crystal layer with a larger dielectric anisotropy may include a liquid crystal compound that has a polar group. For the liquid crystal compound having a polar group, the liquid crystal composition may include at least one compound selected from the following groups: a liquid crystal ester compound, a liquid crystal pyrimidine compound, a liquid crystal cyanobiphenyl compound, a liquid crystal cyanophenylcyclohexane compound, a liquid crystal cyano terphenyl compound, and a liquid crystal difluorostilbene compound.

All of the liquid crystal layers can differ from each other in thickness, and the dielectric anisotropy of the liquid crystal compound in each liquid crystal layer may be different from the others. In this way, the level of freedom in designing the liquid crystal compounds included in the liquid crystal layers increases, and the light modulation characteristics required of each liquid crystal layer can be optimized.

The drive voltage ranges for all of the liquid crystal layers may be made substantially identical as well. By making the drive voltage ranges for all of the liquid crystal layers substantially identical, drive control becomes easy and a common drive IC can be used.

The liquid crystal composition included in each liquid crystal layer may comprise a liquid crystal compound and an additive. For the additive, a substance that includes a compound that has at least one asymmetric carbon may be used. By adding such an additive to nematic liquid crystal as a chiral agent, a liquid crystal composition that exhibits a cholesteric phase at room temperature can be obtained. By changing the amount and type of the chiral agent added, the characteristics of the liquid crystal composition, such as the selective reflection wavelength, can be changed.

If the liquid crystal composition is one that exhibits a cholesteric phase at room temperature, display based on the selective reflection of light of a specific wavelength range may be performed. In addition, multi-color image display may be obtained by using a liquid crystal layer for blue color that displays blue, a liquid crystal layer for green color that displays green and a liquid crystal layer for red color that displays red, stacked in that order from the light receiving side (the viewing side).

A multichroic pigment may be used as an additive to the liquid crystal composition. By using a multichroic pigment, the chromatic purity of the display of the liquid crystal layer can be improved.

Each liquid crystal layer may be driven by using so called the guest-host effect. Such display may be performed by using a liquid crystal composition comprising nematic liquid crystal to which a multichroic pigment is added, for example. In this case, by controlling the orientation of the pigment molecules by changing the liquid crystal molecular alignment, the liquid crystal layer may be alternated between a colored state and a non-colored state.

A color filter may be used between at least one pair of adjacent liquid crystal layers. By using a color filter, the chromatic purity of the display of the liquid crystal layer may be improved and the angle of visibility may be improved.

Each liquid crystal layer is preferably held between a pair of substrates. At least one of the substrates may be pliable. By using pliable substrates, the liquid crystal display may be made flexible. In particular, where resin film substrates are used, the liquid crystal display may be made lightweight.

Resin structures may be placed in the light modulation area between the pair of substrates that hold each liquid crystal layer. By placing resin bodies in this way, the distance between the substrates may be accurately maintained and the thickness of the liquid crystal layer may be made uniform. In addition, the substrate distance may be maintained well even if pliable substrates are used, and it is easy to increase the size of the liquid crystal display.

Each liquid crystal layer may comprise a composite film in which the liquid crystal composition is dispersed in a high-polymer matrix. When this is done, it is easy to increase the size of the liquid crystal display and a good angle of visibility may be obtained.

Functional films may be placed on at least one of the pair of substrates that hold the liquid crystal layer, and the thicknesses of the functional films may be made identical for each liquid crystal layer. In this way, the construction of the substrate having functional films may be made identical from one liquid crystal layer to another, which makes manufacturing easy.

According to a fourth aspect of the present invention, a liquid crystal display comprises a plurality of liquid crystal light modulation layers stacked together, each of said liquid crystal light modulation layers including a liquid crystal layer comprising a liquid crystal composition, wherein at least one of component of each of said liquid crystal layers is different from each other.

By giving all of the liquid crystal layers different liquid crystal compositions, it becomes possible to provide the optimal light modulation characteristics in each liquid crystal layer, which leads to high-quality light modulation for the entire liquid crystal display having a layered construction.

In a fifth aspect of the present invention, a liquid crystal display comprises a plurality of liquid crystal light modulation layers stacked together, each of said liquid crystal light modulation layers including a liquid crystal layer comprising a liquid crystal composition, wherein at least two of said liquid crystal layers have different thicknesses and different liquid crystal compositions.

By having at least two liquid crystal layers with different liquid crystal compositions and thicknesses, the variations in the drive voltage range among the liquid crystal layers may be reduced while ensuring optimal light modulation characteristics.

In this liquid crystal display reflecting the fifth aspect, the liquid crystal layers may include two liquid crystal layers that have different thicknesses and in which the dielectric anisotropy included in the thicker layer is larger than that included in the other layer. Because less voltage is required to perform alternation of the liquid crystal layer between a colored state and a non-colored state as the dielectric anisotropy increases, by using this construction, the variations in the drive voltage range among the liquid crystal layers may be accurately eliminated.

In addition, the liquid crystal composition included in the liquid crystal layer with a larger dielectric anisotropy may include a liquid crystal compound that has a polar group. For the liquid crystal compound having a polar group, the liquid crystal composition may include at least one compound selected from the following group: a liquid crystal ester compound, a liquid crystal pyrimidine compound, a liquid crystal cyanobiphenyl compound, a liquid crystal cyanophenylcyclohexane compound, a liquid crystal cyano terphenyl compound, and a liquid crystal difluorostilbene compound.

Furthermore, each of the liquid crystal layers may have a mutual different thickness, and the dielectric anisotropy of the liquid crystal compound in each liquid crystal layer may be different from that in the other layers. In this way, the level of freedom in designing the liquid crystal composition included in the liquid crystal layer increases, and the light modulation characteristics required of each liquid crystal layer may be optimized.

In a sixth aspect of the present invention, a liquid crystal display comprises a plurality of liquid crystal light modulation layers stacked together, each of said liquid crystal light modulation layers including a liquid crystal layer comprising a liquid crystal composition, wherein at least two of said liquid crystal layers have different liquid crystal compositions but identical maximum drive voltages.

By having at least two liquid crystal layers that have different liquid crystal compositions but identical maximum drive voltages, drive control may be made easy while the optimal light modulation characteristics are maintained. In this liquid crystal display, the drive voltage ranges for the liquid crystal layers may be made identical. In this way, drive control is made easier.

In any of the liquid crystal displays reflecting the fifth and sixth aspects of the invention, each of the liquid crystal layers has a different liquid crystal composition. In this way, it becomes possible to provide the optimal light modulation characteristics in each liquid crystal layer, which leads to high-quality light modulation for the entire liquid crystal display having a layered construction.

In any of the liquid crystal displays reflecting the fourth, fifth and sixth aspects of the invention, the liquid crystal composition in each liquid crystal layer may include a liquid crystal compound and an additive. The kind of the additive included in the liquid crystal composition in one liquid crystal layer may be different from the kinds of the additives included in the other liquid crystal layers, and the kind of the liquid crystal compound included in the liquid crystal composition in one liquid crystal layer may be different from the kinds of the liquid crystal compositions in the other liquid crystal layers.

For the additive, a substance that includes a compound that has at least one asymmetric carbon may be used. By adding such an additive to nematic liquid crystal as a chiral agent, a liquid crystal composition that exhibits a cholesteric phase at room temperature may be obtained. By changing the amount and type of the chiral agent added, characteristics of the liquid crystal composition, such as the selective reflection wavelength, may be changed.

The additive may comprise a multichroic pigment. By using a multichroic pigment, the chromatic purity of the display of the liquid crystal layer may be improved.

The liquid crystal layer may be alternated between a selective reflection state and a pass-through state, and the liquid crystal composition may comprise one that exhibits a cholesteric phase at room temperature, for example. In this case, if the liquid crystal layers comprise three layers, i.e., a liquid crystal layer for blue color that displays blue, a liquid crystal layer for green color that displays green, and a liquid crystal layer for red color that displays red, stacked in that order from the light receiving side, high-quality multi-color images may be displayed.

The liquid crystal layer may be alternated between a state in which it absorbs light of a specific wavelength range and a pass-through state, and may comprise one that performs display based on the guest-host effect, for example. This type of display may be realized, for example, by using a liquid crystal composition comprising nematic liquid crystal to which a multichroic pigment is added as an additive. In this case, by controlling the orientation of the pigment molecules by changing the liquid crystal molecular alignment, the liquid crystal layer may be alternated between a colored state and a transparent state.

A color filter may be used between at least one pair of adjacent liquid crystal layers. By using a color filter, the chromatic purity of the display of the liquid crystal, as well as the angle of visibility, may be improved.

Each liquid crystal layer is preferably held between substrates. At least one of the substrates may be pliable. By using pliable substrates, the liquid crystal display may be made flexible. In particular, where resin film substrates are used, the liquid crystal display may be made lightweight.

Resin structures may be placed in the light modulation area between the substrates that hold each liquid crystal layer. By placing resin structures in this way, the distance between the substrates may be accurately maintained and the thickness of the liquid crystal layer may be made uniform. In addition, the substrate distance may be maintained well even if pliable substrates are used, and it is easy to increase the size of the liquid crystal display.

Each liquid crystal layer may comprise a composite film in which the liquid crystal composition is dispersed in a high-polymer matrix. If this is done, increasing the size of the liquid crystal display is easy and a good angle of visibility may be obtained.

Each liquid crystal light modulation layer may include functional films, which may have identical thicknesses. In this way, the construction of the substrates having functional films may be made identical, which makes manufacturing easier.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

The embodiments of the liquid crystal display pertaining to the present invention and its manufacturing method are explained below with reference to the accompanying drawings.

Figure 1:
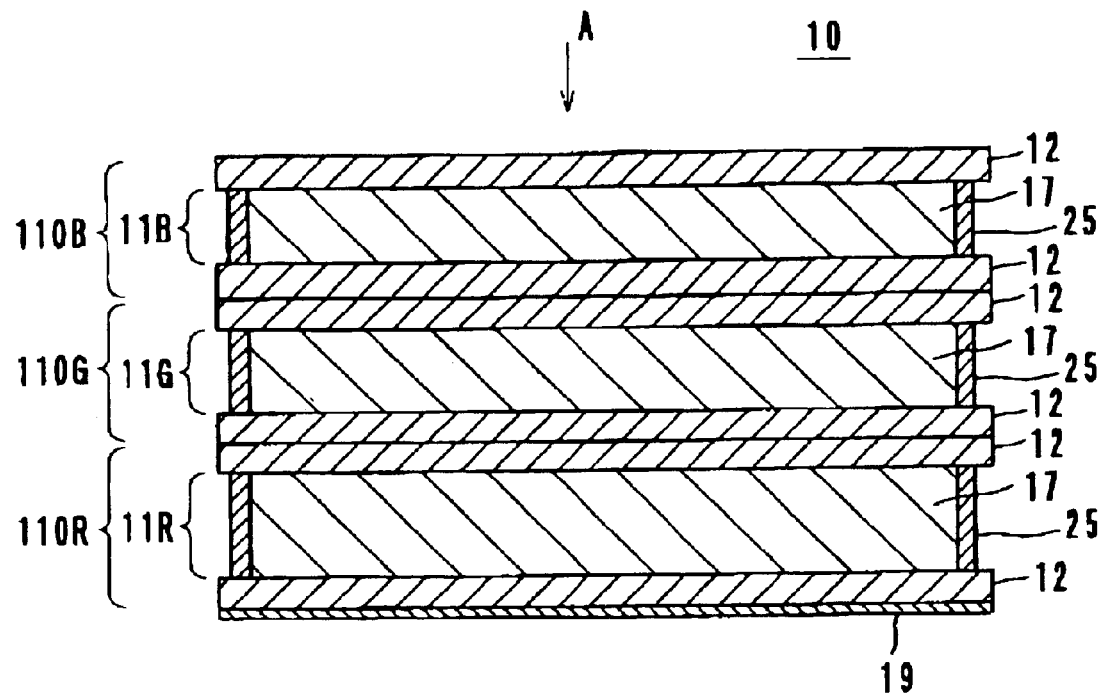
FIG. 1 is a cross-sectional view showing a liquid crystal display comprising a first embodiment of the present invention.

First Embodiment (see FIG. 1)

FIG. 1 shows the basic construction of a liquid crystal display 10 comprising a first embodiment of the present invention. This liquid crystal display 10 comprises a liquid crystal display cell 110R that includes a red display layer 11R, which is alternated between a selective reflection state for red color and a transparent state, a liquid crystal display cell 110G that includes a green display layer 11G, which is alternated between a selective reflection state for green color and a transparent state, and a liquid crystal display cell 110B that includes a blue display layer 11B, which is alternated between a selective reflection state for blue and a transparent state. In addition, a light absorbing layer 19 is placed on the side opposite from the observation side (the viewing side) indicated by an arrow A.

The liquid crystal display cells 110R, 110G and 110B each have a pair of transparent substrates 12 and a liquid crystal composition 17 contained between the substrates 12. Electrodes are formed on the inner side of each substrate 12 (i.e., on the surface that is in contact with the liquid crystal composition 17), and an insulating film and/or orientation control film is also formed where necessary, such that they may function as protective films. These components will be explained in detail below with reference to FIGS. 2, 3 and 4.

Figure 2:
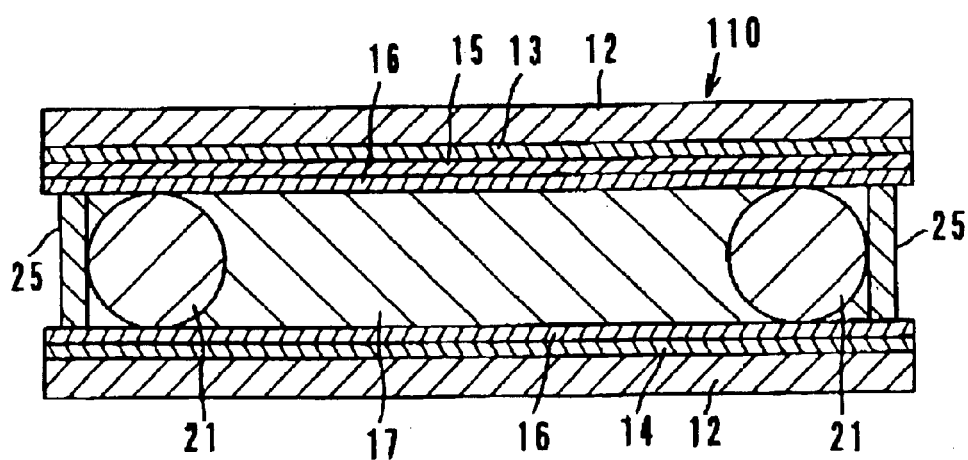
FIG. 2 is a cross-sectional view showing a first example of a cell comprising a component of the liquid crystal display.

First Example of Cell Construction (see FIG. 2)

FIG. 2 shows the construction of any cell 110 from among the liquid crystal display cells 110R, 110G and 110B. Transparent electrodes 13 or 14, which are formed to have a strip-shape configuration and be parallel to each other, are located on the inner surface of each substrate 12. These electrodes 13 and 14 are placed such that they face each other so that the extending direction of the electrodes 13 is orthogonal to that of the electrodes 14 to form a matrix. An insulating film 15 and orientation control film 16 are formed on the electrodes 13, while an orientation control film 16 is formed on the electrodes 14. The liquid crystal composition 17 comprises one that exhibits a cholesteric phase at room temperature, and is contained between the substrates 12 with spacers 21 by means of sealing members 25, as explained in detail below.

Figure 3:
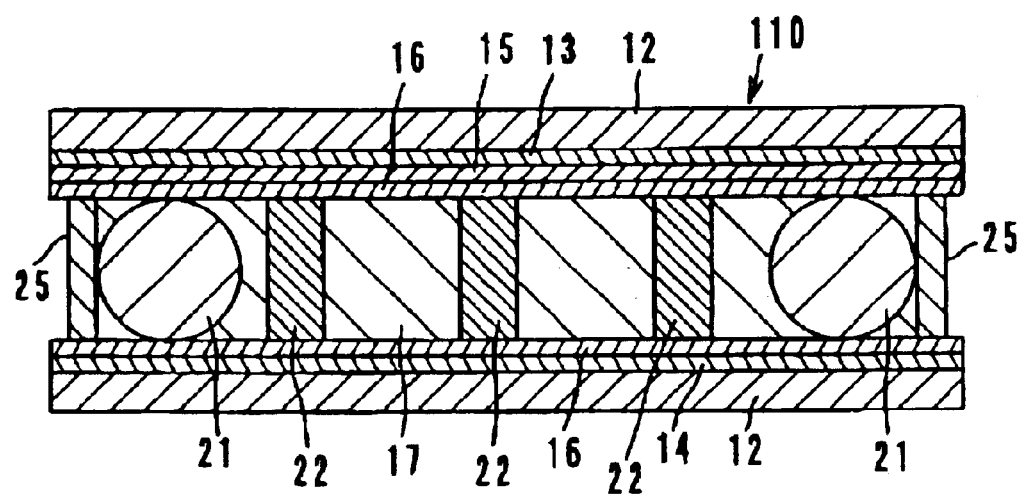
FIG. 3 is a cross-sectional view showing a second example of a cell comprising a component of the liquid crystal display.

Second Example of Cell Construction (see FIG. 3)

FIG. 3 shows the construction of any cell 110 from among the liquid crystal display cells 110R, 110G and 110B. While the basic construction is the same as that of the cell 110 shown in FIG. 2, it differs in that it has cylindrical column structures 22 comprising a high-polymer substance located between the substrates 12.

Figure 4:
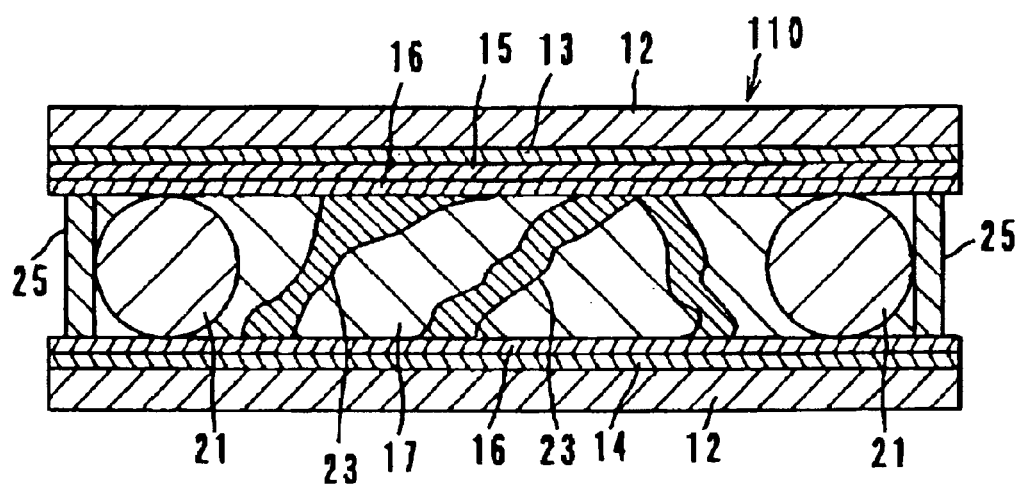
FIG. 4 is a cross-sectional view showing a third example of a cell comprising a component of the liquid crystal display.

Third Example of Cell Construction (see FIG. 4)

FIG. 4 shows the construction of any cell 110 from among the liquid crystal display cells 110R, 110G and 110B. While the basic construction is the same as the cell 110 shown in FIG. 2, it differs in that it has a high-polymer matrix 23 located between the substrates 12.

Figure 5:
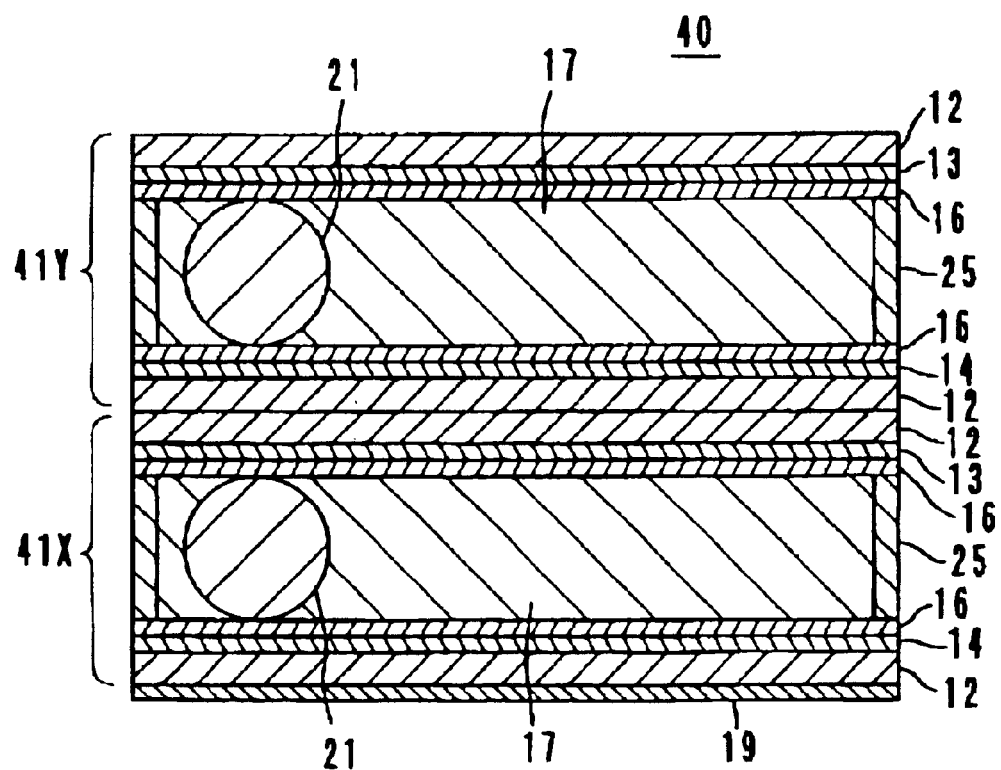
FIG. 5 is a cross-sectional view showing a liquid crystal display comprising a second embodiment of the present invention.

Second embodiment (see FIG. 5)

FIG. 5 shows the basic construction of a liquid crystal display 40 comprising a second embodiment of the present invention. This liquid crystal display 40 has a double-layer construction and comprises liquid crystal display cells 41X and 41Y.

In FIG. 5, the members identical to those shown in FIGS. 1 through 4 are given the same symbols, and will not be explained. Column-like high-polymer structures 22 shown in FIG. 3 or the high-polymer matrix 23 shown in FIG. 4 may be formed in the cells 41X and 41Y.

In either embodiment explained above, the layered liquid crystal display may include at least two liquid crystal layers having different thicknesses. Giving the liquid crystal layers different thicknesses contributes to eliminating the variations in drive voltage among the liquid crystal layers. The thicknesses of each liquid crystal layer may be different.

Display Method 1 (Where Selective Reflection Based on the Cholesteric Phase is Used)

In each cell of the liquid crystal displays 10 and 40 having the constructions described above, display is performed by applying a pulse voltage to the electrodes 13 and 14. In other words, where a liquid crystal composition that exhibits a cholesteric phase is used for the liquid crystal composition 17, the liquid crystal is made to enter a planar state through the application of a pulse voltage having a relatively high level of energy. In this state, the liquid crystal selectively reflects light of the wavelength that is determined based on the helical pitch (chiral pitch) and the refractive index of the liquid crystal molecules. The liquid crystal is made to enter a focal conic state through the application of a pulse voltage having a relatively low level of energy, whereby it becomes transparent or light transmission condition due to the focal conic state thereof. Each state is maintained without the application of voltage.

There is known to be an intermediate state between the focal conic state and the planar state, and half-tone colors may be displayed by applying a pulse voltage having an intermediate level of energy. In an intermediate state, it is thought that molecules in a focal conic state and molecules in a planar state coexist, and this state is maintained without the application of voltage as well. If a light absorbing layer 19 is used, black is displayed when the liquid crystal display is in a focal conic state.

In the liquid crystal display of this embodiment, the areas at which the strip-shaped electrodes 13 and 14 intersect comprise the display pixels. In this specification, the range in which light modulation is performed by the liquid crystal is called the light modulation area, and the area around this range is called a non-light modulation area where no light modulation is performed. In the liquid crystal display of this embodiment, the light modulation area comprises the display area.

Display Method 2 (Displayed Based on the Guest-Host Effect)

Where a material comprising liquid crystal to which a multichroic pigment such as a dichroic pigment is added is used as the liquid crystal composition, the orientation of the liquid crystal molecules may be changed between the state in which voltage is being applied to the electrodes 13 and 14 and the state in which no voltage is applied. Based on this change in molecular orientation, the liquid crystal may be alternated between a colored state and a non-colored state.

Substrate

The substrates 12 must be transparent except for the one that is placed at the bottom of the liquid crystal display. For the transparent substrates, in addition to glass substrates, flexible substrates made of polycarbonate (PC), polyether sulfone (PES) or polyethylene terephthalate (PET) may be used.

Electrode

For the electrodes 13 and 14, a transparent conductive film such as ITO (indium tin oxide) film, metal electrodes made of aluminum or silicon, or a photoconductive film made of amorphous silicon or BSO (bismuth silicon oxide) may be used. In order to form the electrodes 13 and 14 in a strip-shape configuration, ITO film should be formed on the substrate 12 by means of sputtering and then patterned by means of photolithography, for example.

Insulating Film, Orientation Control Film, and Color Filter

The insulating film 15 comprises an inorganic film made of silicon oxide or an organic film made of polyimide resin, epoxy resin, acrylic resin or urethane resin, and serves to prevent short-circuiting of the electrodes 13 and 14, and as a gas barrier layer to improve the reliability of the liquid crystal. Polyimide resin or silicon resin may be used so as to also work as an orientation control film 16. Moreover, if a pigment is added, the film functions as a color filter as well. The material used for the high-polymer bodies 22 may also be used as an insulating film 15.

By adjusting the thicknesses of such functional films as the insulating film and orientation control film, the effective voltages may be set within a certain range. It is preferred that this be done in a manner that does not complicate the manufacturing method or give rise to the problem of non-uniformity of film thickness.

Liquid Crystal Composition

Where selective reflection based on a liquid crystal exhibiting a cholesteric phase is used, a liquid crystal composition that exhibits a cholesteric phase at room temperature is preferred. Chiral nematic liquid crystal comprising nematic liquid crystal to which a chiral agent is added is suitable for such a use. The selective reflection wavelength range may be adjusted by increasing or decreasing the amount of the chiral agent added, so that the selective reflection wavelength may be set within or outside the visible light range. A pigment may be added to the liquid crystal composition as well. Nematic liquid crystal has rod-like liquid crystal molecules aligned in a parallel fashion, but does not have a layered construction.

For such nematic liquid crystal, various types of liquid crystal may be used without particular limitations. In particular, nematic liquid crystal that includes a liquid crystal compound having a polar group such as a liquid crystal ester compound, a liquid crystal pyrimidine compound, a liquid crystal cyanobiphenyl compound, a liquid crystal cyanophenylcyclohexane compound, a liquid crystal cyano terphenyl compound, a liquid crystal difluorostilbene compound, or a liquid crystal tolane compound is effective in increasing the dielectric anisotropy of the liquid crystal composition. The nematic liquid crystal may comprise a mixture of two or more liquid crystal compounds. Other than the compounds identified above, the liquid crystal composition may include such liquid crystal components as a polycyclic compound or an N-type compound that increases the transfer temperature at which the liquid crystal composition becomes isotropic.

Chiral nematic liquid crystal has the advantage that the pitch of its helical construction may be changed by changing the amount of the chiral agent added, through which the selective reflection wavelength of the liquid crystal may be controlled. Generally, as the term to express the pitch of the helical construction of liquid crystal molecules, 'helical pitch' is used, defined as the molecular distance when the liquid crystal molecule rotates 360° along the helical construction.

The general structural formulae (I) through (VI) for six representative liquid crystal compounds that can increase the dielectric anisotropy are shown below.

(I) Liquid Crystal Ester Compound

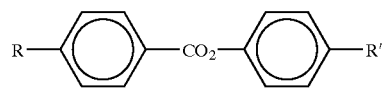

The aromatic rings may be replaced with cyclohexane, and the ring number should be between 2 to 4. R represents an alkyl group or an alkoxyl group. R' represents CN, halogen or hydrogen or a combination thereof.

(II) Liquid Crystal Pyrimidine Compound

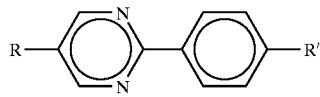

R represents an alkyl group or an alkoxyl group. R' represents CN, halogen or hydrogen or a combination thereof.

(III) Liquid Crystal Cyanobiphenyl Compound

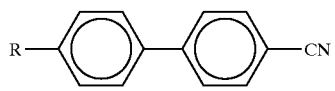

R represents an alkyl group.

(IV) Liquid Crystal Cyanophenylcyclohexane Compound

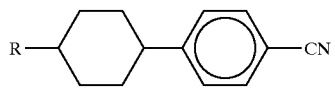

R represents an alkyl group.

(V) Liquid Crystal Cyano Terphenyl Compound

R represents an alkyl group or an alkoxyl group. R' represents halogen or hydrogen or a combination thereof.

(VI) Liquid Crystal Difluorostilbene Compound

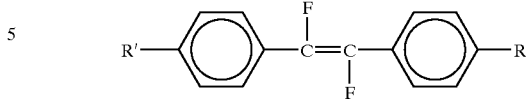

The aromatic rings may be replaced with cyclohexane, and the ring number should be between 2 to 4. R represents an alkyl group or an alkoxyl group. R' represents CN, halogen or hydrogen or a combination thereof.

A chiral agent is an additive that twists the molecules of nematic liquid crystal when added to nematic liquid crystal. By adding a chiral agent to nematic liquid crystal, a helical structure of liquid crystal molecules with a certain twist distance occurs, based on which the liquid crystal exhibits a cholesteric phase.

The chiral agent to add should include at least one compound that has at least one asymmetric carbon, and its helical sense (the orientation of the twist given to the liquid crystal) may be in the same direction or in different directions. It is preferred that the chiral agent be added to the liquid crystal compound in an amount of approximately 45% or less by weight, and more particularly, 40% or less by weight. If the amount added exceeds 45% by weight, such problems as crystallization easily occur. There is no lower limit to the amount of chiral agent added, so long as the amount is sufficient to cause selective reflection in the liquid crystal composition, but it is preferred that the amount be 10% or more by weight.

For the chiral agent to be added to the nematic liquid crystal, two or more types of chiral agents may be mixed. In addition to mixing types having the same optical activity, those having different optical activities may be mixed in combination as well. Using two or more chiral agents or using a liquid crystal component such as a polycyclic compound or an N-type compound as the chiral agent serves to change various properties of the cholesteric liquid crystal, including the dielectric anisotropy, refractive anisotropy and viscosity, so as to improve the characteristic of the liquid crystal display, and also serves to change the transfer temperature of the cholesteric liquid crystal and reduce the change in the selective reflection wavelength caused by a change in temperature.

The general structural formulae (A) through (F) and specific structural formulae (A1) through (A10), (B1) through (B10), (C1) through (C10), (D1) through (D10), (E1) through (E10) and (F1) through (F9) of representative chiral agents are shown below.

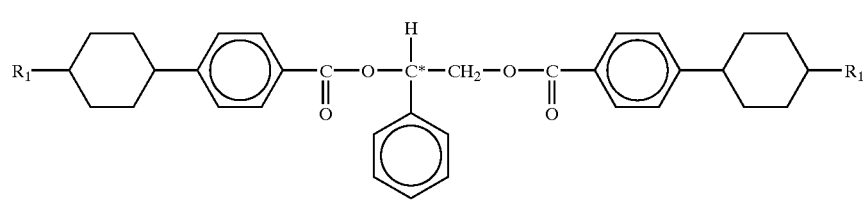

(A)

R1 and R2 each represent an alkyl group or an alkokyl group with a carbon number of 1 to 10.

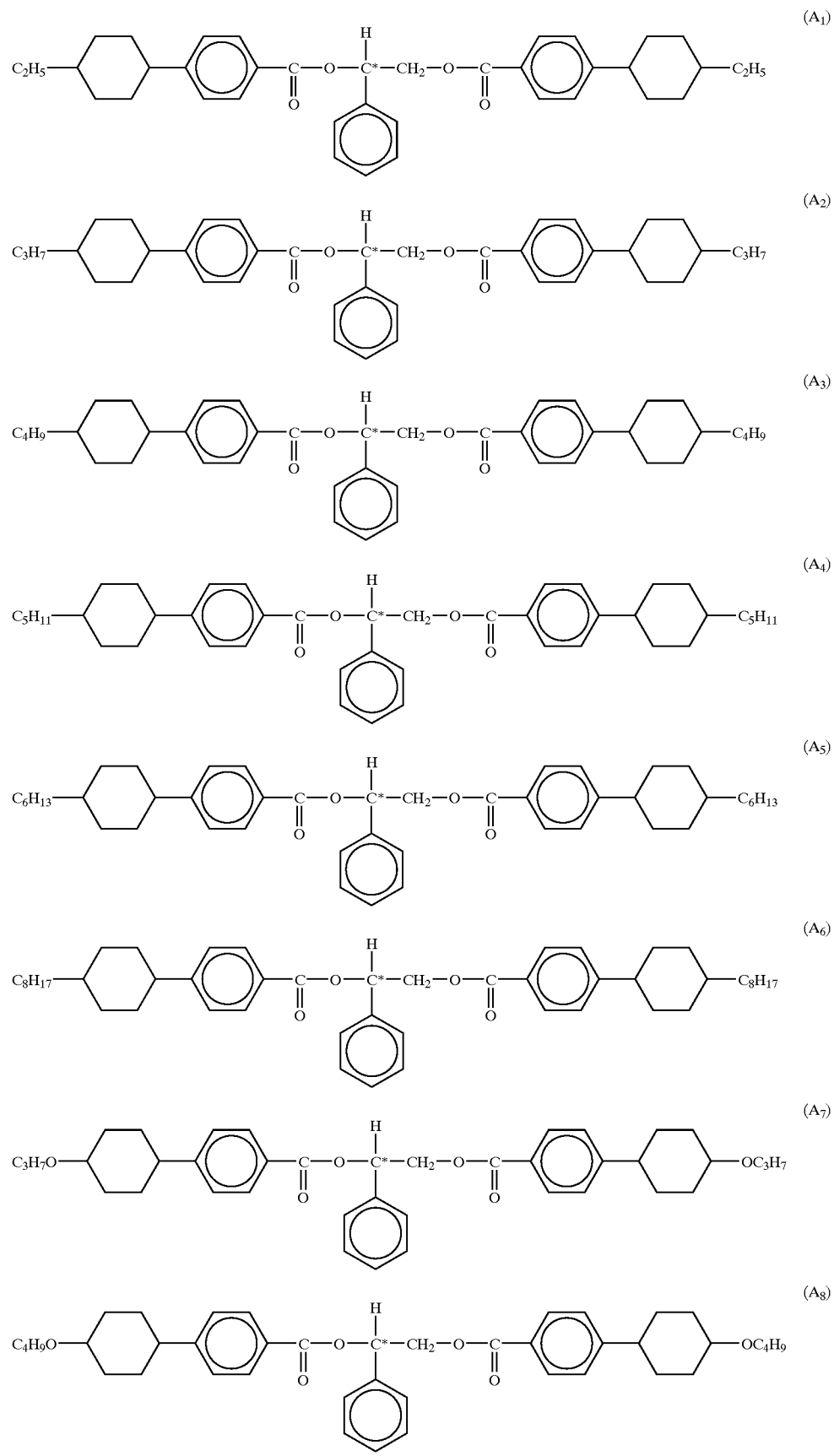

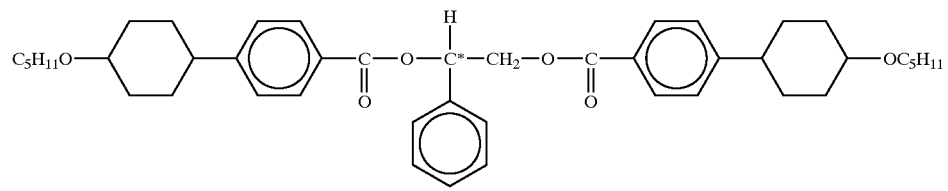
(A9)
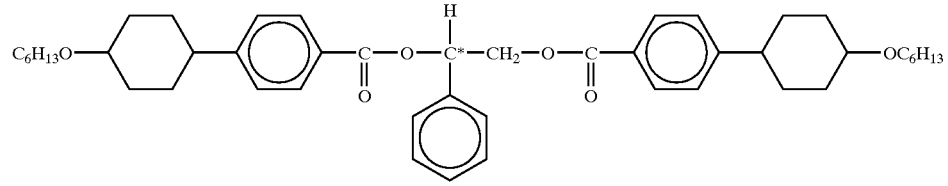
(A10)
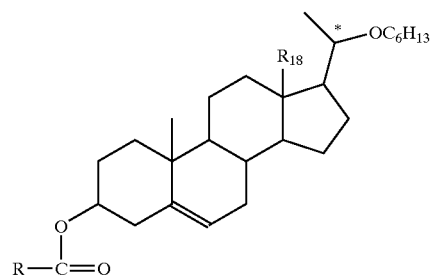
(B)
R represents an alkyl group with a carbon number of 1 to 10.
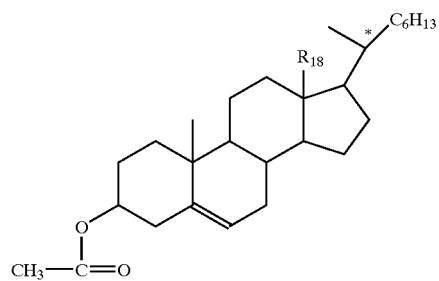
(B1)
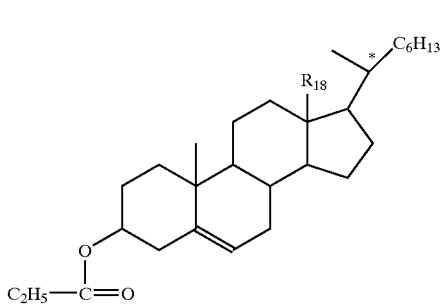
(B2)
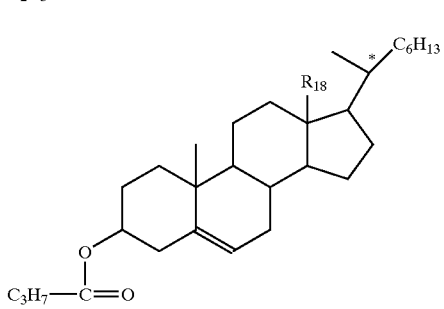
(B3)
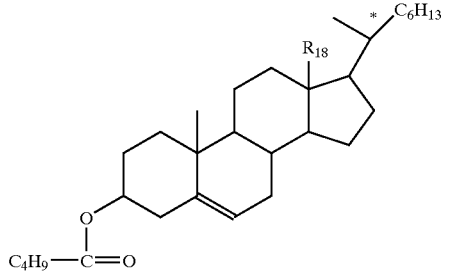
(B4)
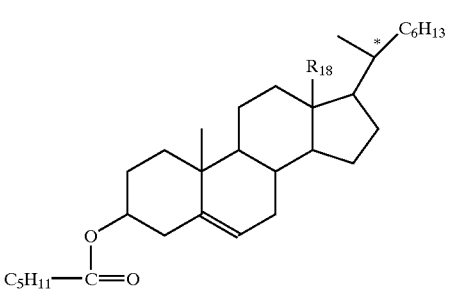
(B5)
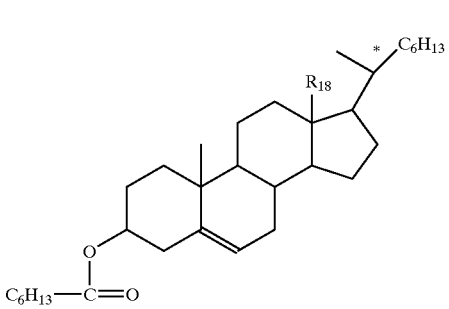
(B6)

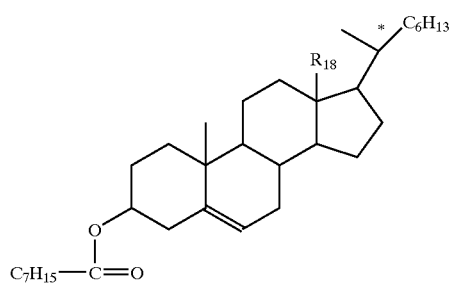
(B$_7$)
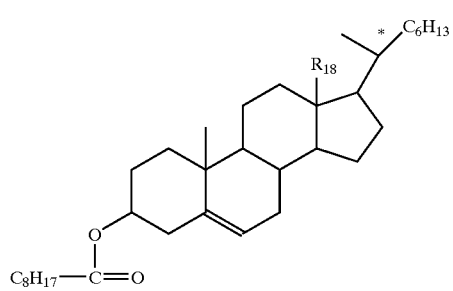
(B$_8$)
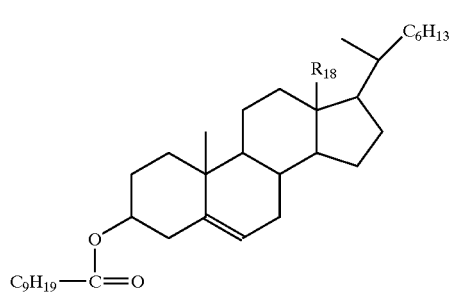
(B$_9$)
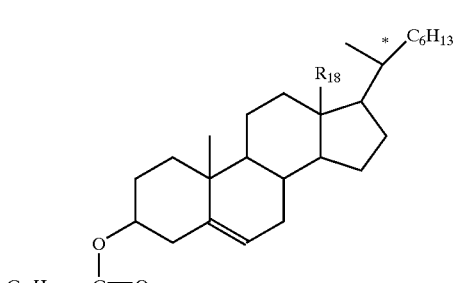
(B$_{10}$)
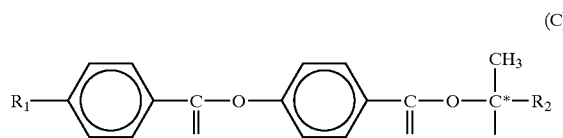
(C)
R1 represents an alkyl group or an alkokyl group with a carbon number of 1 to 10. R2 represents an alkyl group with a carbon number of 2 to 10.
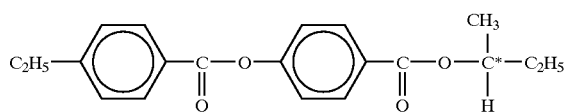
(C$_1$)
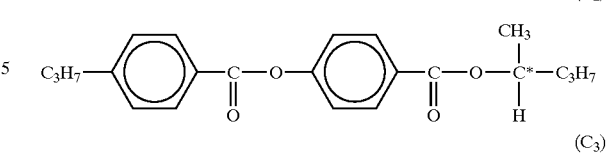
(C$_2$)
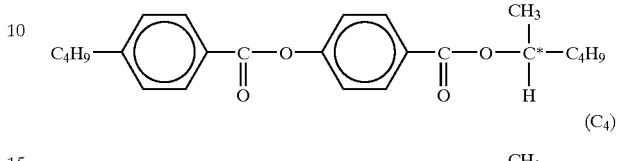
(C$_3$)
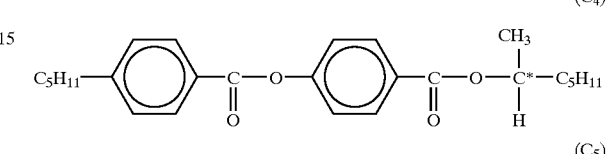
(C$_4$)
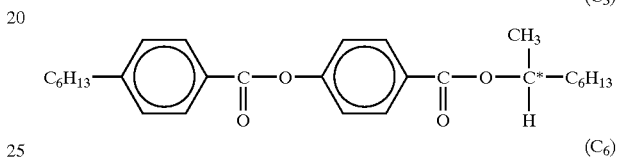
(C$_5$)
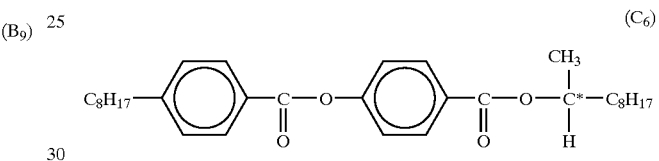
(C$_6$)
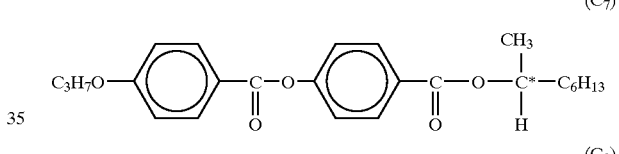
(C$_7$)
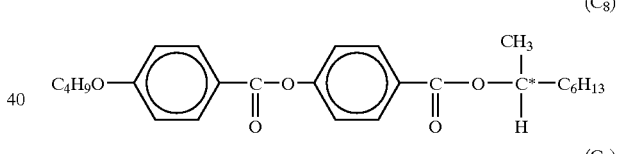
(C$_8$)
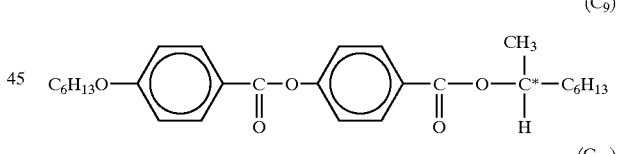
(C$_9$)
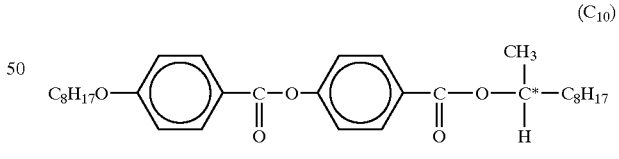
(C$_{10}$)
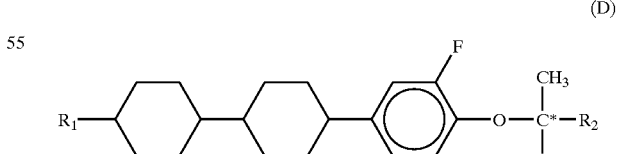
(D)
R1 represents an alkyl group or an alkokyl group with a carbon number of 1 to 10. R2 represents an alkyl group with a carbon number of 2 to 10.

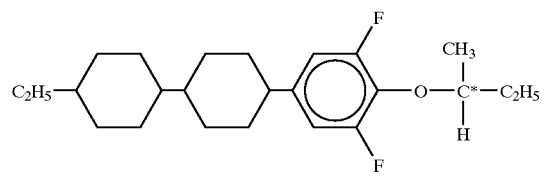
(D₁)
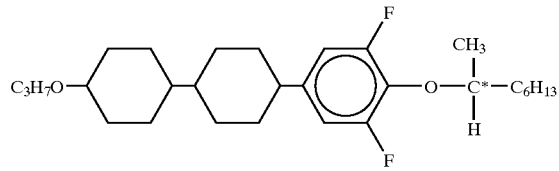
(D₉)
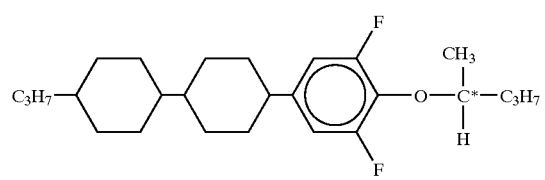
(D₂)
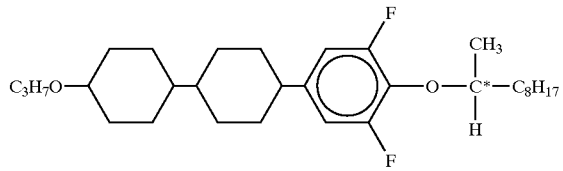
(D₁₀)
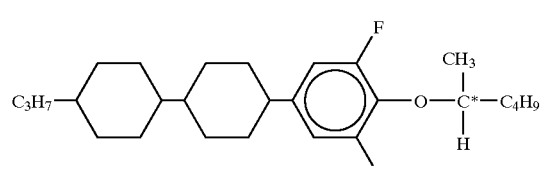
(D₃)
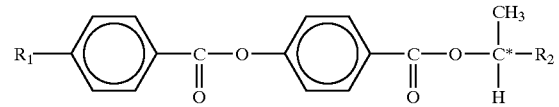
(E)
R1 represents an alkyl group or an alkokyl group with a carbon number of 1 to 10. R2 represents an alkyl group with a carbon number of 2 to 10.
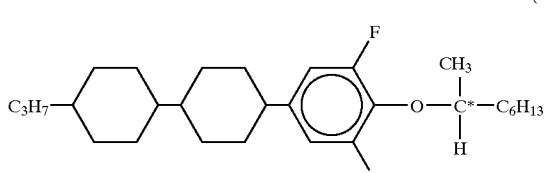
(D₄)
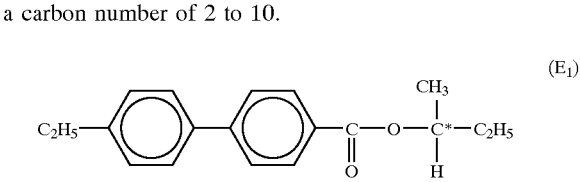
(E₁)
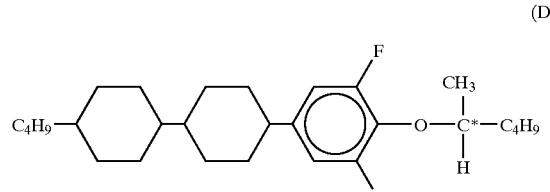
(D₅)
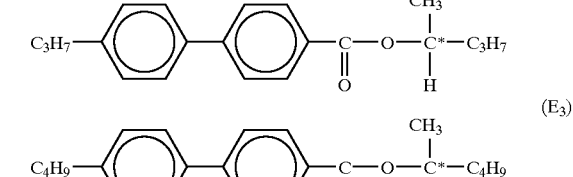
(E₂)
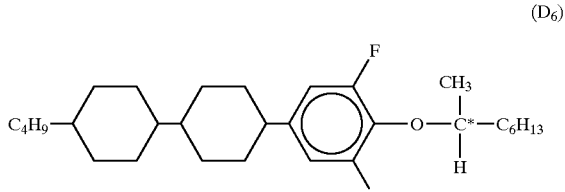
(D₆)
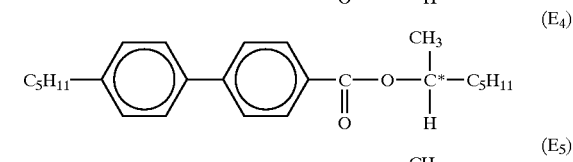
(E₃)
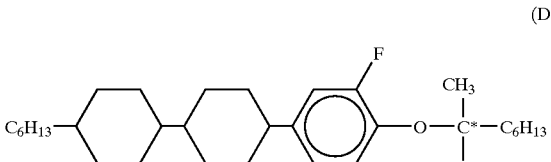
(D₇)
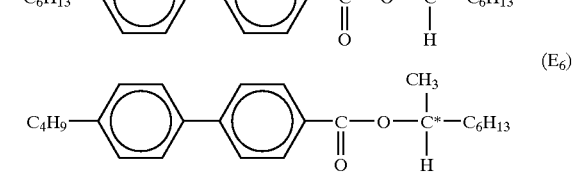
(E₄)
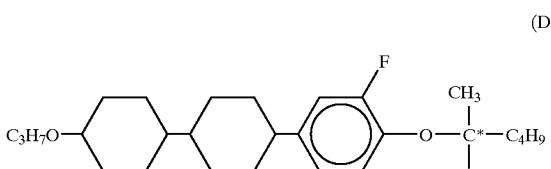
(D₈)
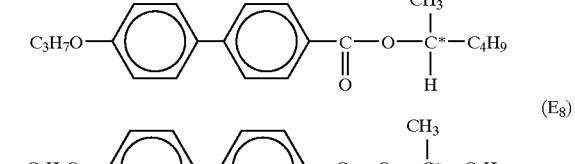
(E₅)
(E₆)
(E₇)
(E₈)

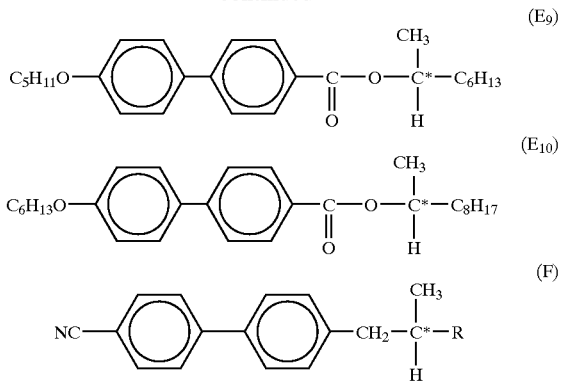

R represents an alkyl group with a carbon number of 1 to 10

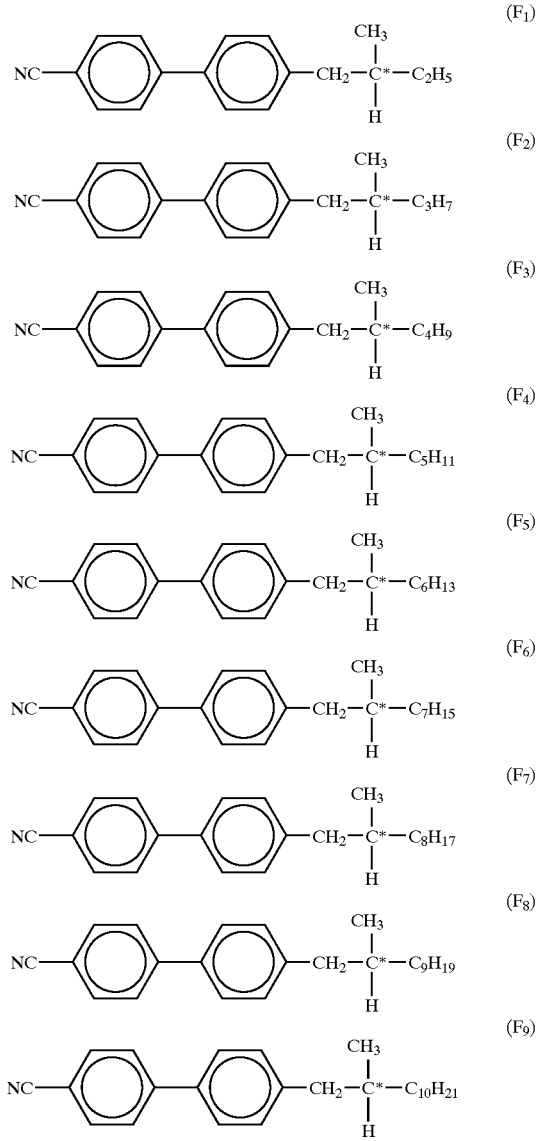

In the display layers 11R, 11G and 11B, in order to improve the chromatic purity of the display performed based on selective reflection, and in order to absorb the light components that lead to reduced transparency when the liquid crystal layers are in a transparent state, a pigment may be added to each display layer, or a colored filter layer that provides the same effect, i.e., a plate member such as a colored glass filter or color film, may be placed on each display layer. A pigment may be added to any of the components of the display layer, i.e., the liquid crystal material, resin material, transparent electrode material or transparent substrate material. More than one component may include the pigment. However, in order to prevent reduced display quality, the pigment or filter layer added should not prevent the color display of the display layer based on selective reflection.

For the pigment added to the liquid crystal material, various conventional pigments may be used, but those that have good compatibility are preferred. For example, an azo compound, a quinone compound, an anthraquinone compound or a dichroic pigment may be used, for example. Two or more of these may be used as well. From among these pigments, the one that does not prevent the display based on selective reflection by the liquid crystal and that absorbs the light components in the wavelength range that causes a reduction in display quality should be selected for use in each display layer. Because the light components that reduce display quality are thought to exist mainly on the short wavelength side, it is preferred that the pigment used absorb the light components in the wavelength range shorter than the selective wavelength of the liquid crystal of each display layer.

Although there are no particular limitations to the amount of the pigment added so long as it does not markedly reduce the state alternation characteristics of the liquid crystal for display, it is preferred that it be added at least in the amount of 0.1% by weight relative to the liquid crystal material. Adding it in the amount of 2% by weight should be sufficient.

Where a color filter is used instead of a pigment, the filter layer material may comprise a non-colored transparent substance to which a pigment is added. A material that is intrinsically colored Without the addition of a pigment or film, which is made of a specific substance that operates in the same manner as a pigment, may also be used. The same effect may be obviously obtained by replacing the transparent substrates 12 with a filter material as described above rather than placing a filter layer on the display layer.

Where the guest-host effect is used, it is preferred that a material comprising nematic liquid crystal to which a multichroic pigment such as a dichroic pigment is added be used. For the nematic liquid crystal and the multichroic pigment, any of those described above may be used.

Spacer

The spacers 21 are used to maintain the gap between the substrates 12 at a prescribed distance. For example, spherical or rod-like spacers made of a resin or inorganic oxide material may be used. The spacers 21 may be fixed or bonded to the substrates 12. The size of the spacers 21 should be determined based on the gap between the substrates, but 1 to 20 μm is preferred. Where the spacers 21 are used in combination with high-polymer structures 22, it is preferred that the spacers 21 account for ½ to ¹/₂₀₀ of the high-polymer structures 22. By using spacers of a different size in each liquid crystal layer, the thicknesses of each liquid crystal layer may be easily made different.

High-Polymer Structure

The high-polymer structures 22 may have any configuration, including a column structure of which profile may a circle, an ellipse, square, and so on, and may be placed randomly or regularly in a lattice-like fashion. Using these high-polymer structures enables the gap between the substrates to be easily maintained, and the self-retention property of the liquid crystal display itself may be improved. In particular, if the high-polymer structures are placed at certain intervals, uniform display performance may be easily obtained.

In order to form these high-polymer structures, the so-called photolithography method may be used, in which a light-hardened resin material such as a photoresist material comprising a UV-hardened monomer is applied onto the substrate in a certain thickness, whereupon the material is then exposed through a mask to UV rays in order to obtain a pattern, and the non-hardened areas are removed.

In addition, high-polymer structures may be formed from thermoplastic resin by using a resin material comprising thermoplastic resin dissolved in an appropriate solvent. In this case, placement of the high-polymer structures may be performed by means of:

(1) the printing method, in which the thermoplastic resin material is extruded out through a screen or metal mask by means of a squeegee;

(2) the dispenser or inkjet method, in which the resin material is expelled onto the substrate from the tips of nozzles; or (3) the transfer method, in which the resin material is supplied on a flat plate or roller and then is transferred onto the substrate surface.

By placing the other substrate on top of the substrate on which the high-polymer structures are thus placed and then heating and pressurizing the substrates, a liquid crystal cell holding high-polymer structures between the substrates may be created.

In order to make the cell thus obtained into a liquid crystal display, a liquid crystal composition should be injected by means of the vacuum injection method between the substrates holding the high-polymer structures between them. Alternatively, a liquid crystal composition may be dropped onto the substrate before the two substrates are placed together, so that the liquid crystal composition may be contained between the substrates when they are glued together.

Furthermore, when forming high-polymer structures, if a spacer material having a smaller size than the thickness of the resin, such as glass fiber, glass balls, ceramic powder or spherical particles made of an organic material, is placed so that the gap does not easily change due to heat or pressure, the gap accuracy is further improved, leading to reduced non-uniformity in voltage or colors.

High-Polymer Film

The high-polymer matrix 23 is a composite film that comprises a three-dimensional network together with the liquid crystal composition. This high-polymer matrix 23 is made in the following way. First, a resin material to which a photopolymerizing starter is added in a prescribed ratio is mixed well with the liquid crystal composition. The mixture is then dropped onto the substrate, the other substrate is placed on top of the first substrate, and the two substrates are glued together. The cell is then irradiated with UV rays in order to polymerize the resin material. For the resin material, a methacrylate compound may be used, for example.

Sealing Member

The sealing member 25 operates to contain the liquid crystal composition 17 so that it does not leak out from the substrates 12, and may comprise a thermosetting resin such as epoxy resin or acrylic resin, or an optical setting (light-hardening) adhesive.

Color Display Method 1 (Where Selective Reflection Based on a Cholesteric Phase is Used)

The liquid crystal display 10 comprising the display layers 11R, 11G and 11B stacked together can perform red display by (i) turning the blue display layer 11B and the green display layer 11G to a transparent condition where the liquid crystal molecules are set in a focal conic state and (ii) turning the red display layer 11R to a selective reflection condition where the liquid crystal molecules are set in a planar state. It can perform yellow display by (i) turning the blue display layer 11B to a transparent condition where the liquid crystal molecules are set in a focal conic state and (ii) turning the green display layer 11G and the red display layer 11R to a selective reflection condition where the liquid crystal molecules are set in a planar state. Similarly, it can perform display of red, green, blue, white, cyan, magenta, yellow or black by appropriately turning the display layers to either a transparent or a selective reflection state. Furthermore, by selecting an intermediate selective reflection state as the state of the display layer 11R, 11G or 11B, halftone display becomes possible so that the liquid crystal display may be used as a full color display.

Moreover, the order in which the display layers 11R, 11G and 11B are stacked in the liquid crystal display 10 may be different from that shown in FIG. 1. However, considering that the light in the long wavelength range has a higher permeability that the light in the short wavelength range, if the selective reflection wavelength of the liquid crystal in the upper layer is shorter than that of the liquid crystal in the lower layers, more light passes through to the lower layers, and therefore a brighter display may be obtained. Therefore, it is most preferred that the display layers be stacked, from the observation side (the side indicated by the arrow A), in the order of the blue display layer 11B, the green display layer 11G and the red display layer 11R. When the liquid crystal display 10 comprises display layers stacked in this order, the most desirable display quality may be obtained.

Color Display Method 2 (Where the Guest-Host Effect is Used)

For example, one cell of the liquid crystal display 40 is made the cell that shows the background color, and the other cell is made the cell that shows the display color, such that the images may be displayed using a single color. For example, if the lower cell comprises a display layer that may be alternated between a red display condition and a transparent condition, while the upper cell comprises a display layer that may be alternated between a blue display condition and a transparent condition, red images may be displayed on a blue background. Naturally, any combination of background color and display color may be used.

Example of Cell Manufacturing

Figure 6:
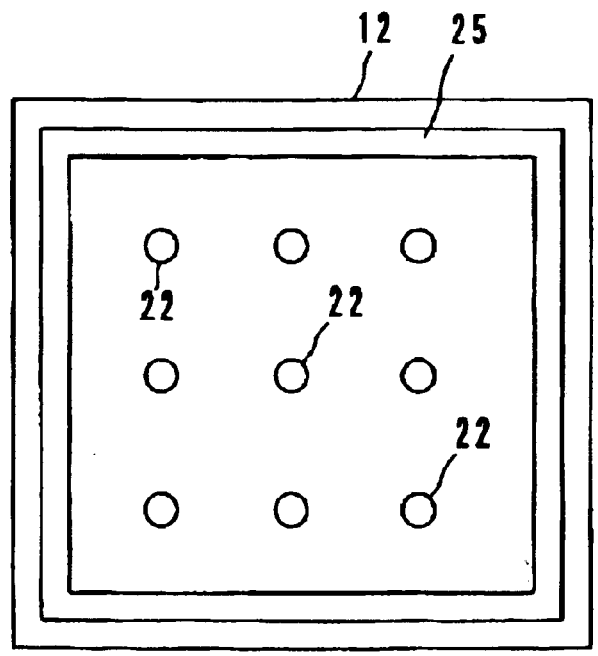
FIG. 6 is a plan view showing a film substrate, a component of the cell, on which cylindrical bodies and sealing members are formed.
Figure 7:
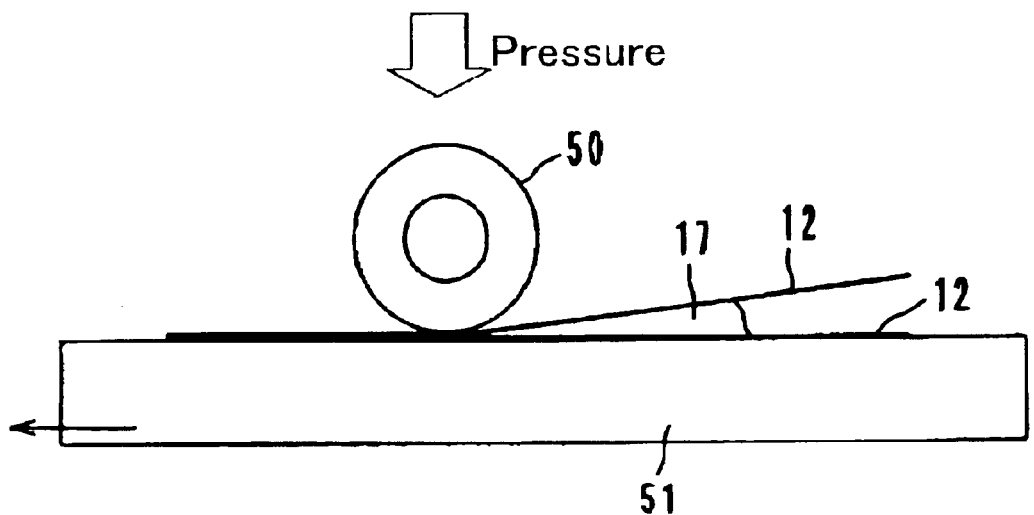
FIG. 7 is a drawing to explain the manufacturing process for the cell.

One example of how to make the cells of the liquid crystal display will be explained below. First of all, transparent electrodes made of ITO film are formed by means of the public-domain sputtering method on a substrate 12 made of resin film, and an insulating film and an orientation control film are formed where necessary. A resin material is then printed on the substrate 12 by means of a screen printer, as shown in FIG. 6, to form high-polymer structures 22. A sealing member 25 is then formed to the edges of the substrate. As the other substrate, a substrate on which transparent electrodes are formed, as well as insulating film or orientation controls film where necessary, is used. The other substrate is placed on top of the first substrate so that the transparent electrode surfaces face each other. After dropping a liquid crystal composition into the space between the substrates, the cell is heated and pressurized by means of a gluing device comprising a flat panel 51 and a roller 50 shown in FIG. 7, in order to contain the liquid crystal composition. A liquid crystal display cell is created in this way. Creating two or more cells having a different liquid crystal composition in each cell and then stacking them may obtain a layered liquid crystal display that performs multicolor display.

By adjusting one or more of the following parameters, i.e., the thickness of the liquid crystal layer, the type of liquid crystal composition, the dielectric anisotropy of the liquid crystal composition or the thicknesses of the functional films, at least two liquid crystal layers may be made to have identical drive voltage ranges. These parameters are explained below.

The thickness of the liquid crystal layer will first be explained. Research by the inventors indicates that the fact that the optimal drive voltage range to perform display redraw varies from one layer to another in a conventional layered liquid crystal display is due to the fact that the liquid crystal composition of each layer has a different dielectric anisotropy because the liquid crystal composition in each layer is adjusted so that it modulates light of a different color from the other layers. The dielectric anisotropy of the liquid crystal composition and the drive voltage are closely related. The larger the dielectric anisotropy of the liquid crystal composition, the smaller the drive voltage, and conversely, the smaller the dielectric anisotropy, the larger the drive voltage. Generally, in a given liquid crystal composition, the larger the thickness, the larger the required drive voltage. Therefore, where the drive voltage is sought to be lowered, the thickness of the liquid crystal layer is reduced, and conversely, where the drive voltage is sought to be increased, the thickness of the liquid crystal layer is increased.

Adjustment of the liquid crystal composition of each layer so that the liquid crystal layers will have identical dielectric anisotropic values, and therefore identical voltage ranges, gives rise to such problems as reduced contrast and reduced color reproduction range, and it becomes difficult to select the optimal composition that will give the layers the same drive voltage range while maintaining good light modulation characteristics. On the other hand, if the layers are given the same drive voltage range by changing the thicknesses of the functional films such as the insulating films and orientation control films on the substrate surfaces, the films must be precisely made with prescribed thicknesses, which makes manufacturing difficult. If the film thickness is uneven, the display layers may not require the same drive voltage. The thickness of a liquid crystal layer may be easily adjusted by changing the size of the spacers held between the substrates. Therefore, adjustment of the drive voltage range based on the thickness of the liquid crystal layer is easier than adjustment using the other parameters described above.

The dielectric anisotropy of the liquid crystal composition may be adjusted by changing the polarity of the liquid crystal composition itself. Here, the stronger the polarity, the larger the dielectric anisotropy, and thus the smaller the drive voltage. Therefore, if the dielectric anisotropy of the liquid crystal composition of each cell is made identical, the liquid crystal layers may be given the same drive voltage. In particular, if each liquid crystal layer has a different liquid crystal composition, each liquid crystal composition may have a different dielectric anisotropy even while each liquid crystal layer maintains the optimal light modulation characteristics.

Using different kinds of liquid crystal compounds and additives that comprise the liquid crystal composition may change the liquid crystal composition. In particular, the use of a nematic liquid crystal including a liquid crystal compound that has a polar group, such as in the liquid crystal compositions described above, helps to increase the dielectric anisotropy of the liquid crystal composition. Normally in chiral nematic liquid crystal, more of the chiral agent must be added in order to make the selective reflection wavelength shorter, and as the amount added increases, the dielectric anisotropy decreases. Therefore, in order to give the liquid crystal layers similar dielectric anisotropic values, as the selective reflection wavelength of nematic liquid crystal of the liquid crystal compound decreases, the dielectric anisotropy should increase. Where display is performed based on the guest-host effect, since the fluctuation range of the drive voltage based on the amount of the multichroic pigment added is small, it is preferred that a different nematic liquid crystal material, which comprises the main component of the liquid crystal composition, be used.

All of the liquid crystal layers may have mutually different liquid crystal compositions. In this way, each liquid crystal layer may have the optimal display characteristics, so that high-quality image display becomes possible for the layered liquid crystal display as a whole.

As the thickness of a functional film increases, its insulating property and therefore its required drive voltage also increases. Therefore, where the drive voltage is sought to be lowered, the thicknesses of the functional films should be reduced, and conversely, where the drive voltage is sought to be increased, the thicknesses of the functional films should be increased. The thickness of a functional film may be changed by changing the film forming parameters such as the density of the material and the speed of application during the film formation process.

Display Drive Circuit and Drive Method

Figure 8:
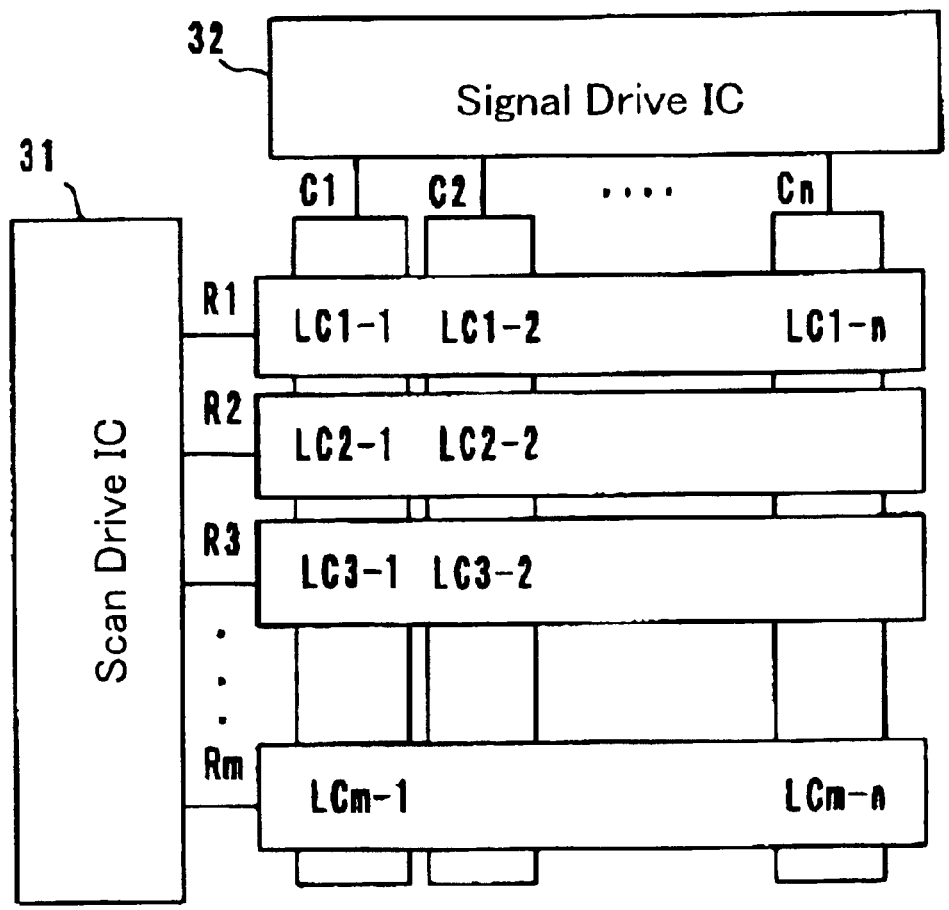
FIG. 8 is a block diagram showing the matrix drive circuit of the liquid crystal display.

Because each liquid crystal display cell of the liquid crystal display 10 has a simple matrix pixel construction, the pixels may be expressed by the matrix (m×n) of the scanning electrodes R1 through Rm and the signal electrodes C1 though Cn, as shown in FIG. 8. The pixel at the intersection of a scanning electrode Ra and a signal electrode Cb (a and b are natural numbers satisfying the conditions a≦m and b≦n, respectively) is deemed (LCa–b). These groups of electrodes are connected to the output terminals of the scan drive IC 31 and the signal drive IC 32, respectively, so that a scanning voltage and a selection voltage are applied to each electrode from these drive ICs 31 and 32.

The drive circuit of the liquid crystal display 10 is not limited to this driver having a matrix construction. Image data may be serially transferred to each line for the scan drive IC 31 from the signal drive IC 32 via a line latch memory.

Figure 9:
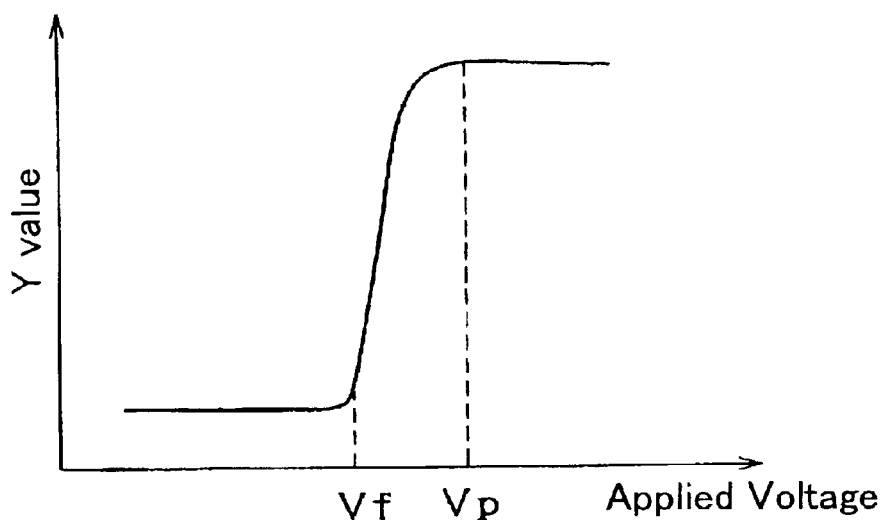
FIG. 9 is a graph showing the relationship between the voltage applied to the selection signal electrodes in the matrix drive circuit and the Y-value.

In the liquid crystal display 10, the display status of the liquid crystal layer is a function of the applied voltage and the pulse width. To explain this using the case in which display is performed based on selective reflection when the liquid crystal is in a cholesteric phase, when a pulse voltage having a certain width is initially applied to the liquid crystal layer after it is set to a focal conic state, in which it exhibits the lowest Y value (luminous reflectance), the display status changes in the manner shown in FIG. 9. In FIG. 9, the vertical axis represents the Y value and the horizontal axis represents the applied voltage. When a pulse voltage Vp is applied, the planar state is selected, in which the highest Y value is exhibited. When a pulse voltage Vf is applied, the focal conic state, in which the lowest Y value is exhibited, is selected. When a voltage between these two values is applied, the liquid crystal enters the state in which an intermediate Y value is shown, i.e., molecules in a planar state and molecules in a focal conic state coexist, so that halftone display may be performed.

Figure 10:
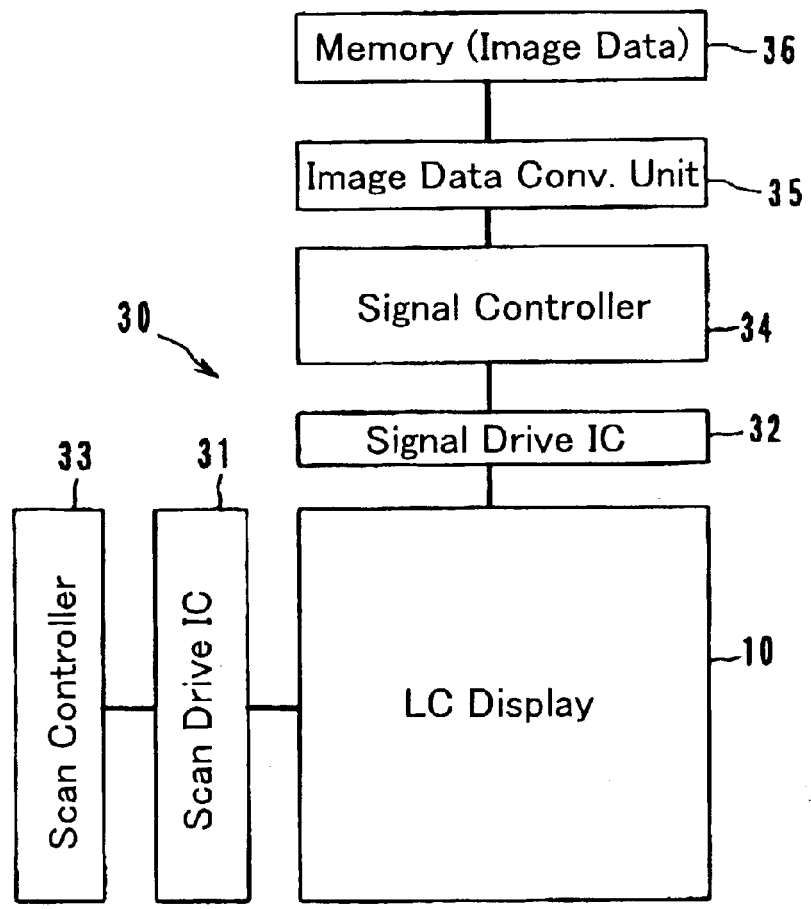
FIG. 10 is a block diagram showing the drive/image signal processing circuit of the liquid crystal display.

FIG. 10 shows the drive/image signal processing circuit 30 to redraw image data. The scan drive IC 31 and the signal drive IC 32 are connected to the liquid crystal display 10, and these ICs 31 and 32 are driven by the control signals from the scanning controller 33 and the signal controller 34, respectively. Image data to be newly displayed is input from the memory 36 to the signal controller 34, but before this input, the image data is converted into selection signals by means of an image data conversion unit 35.

Figure 11:
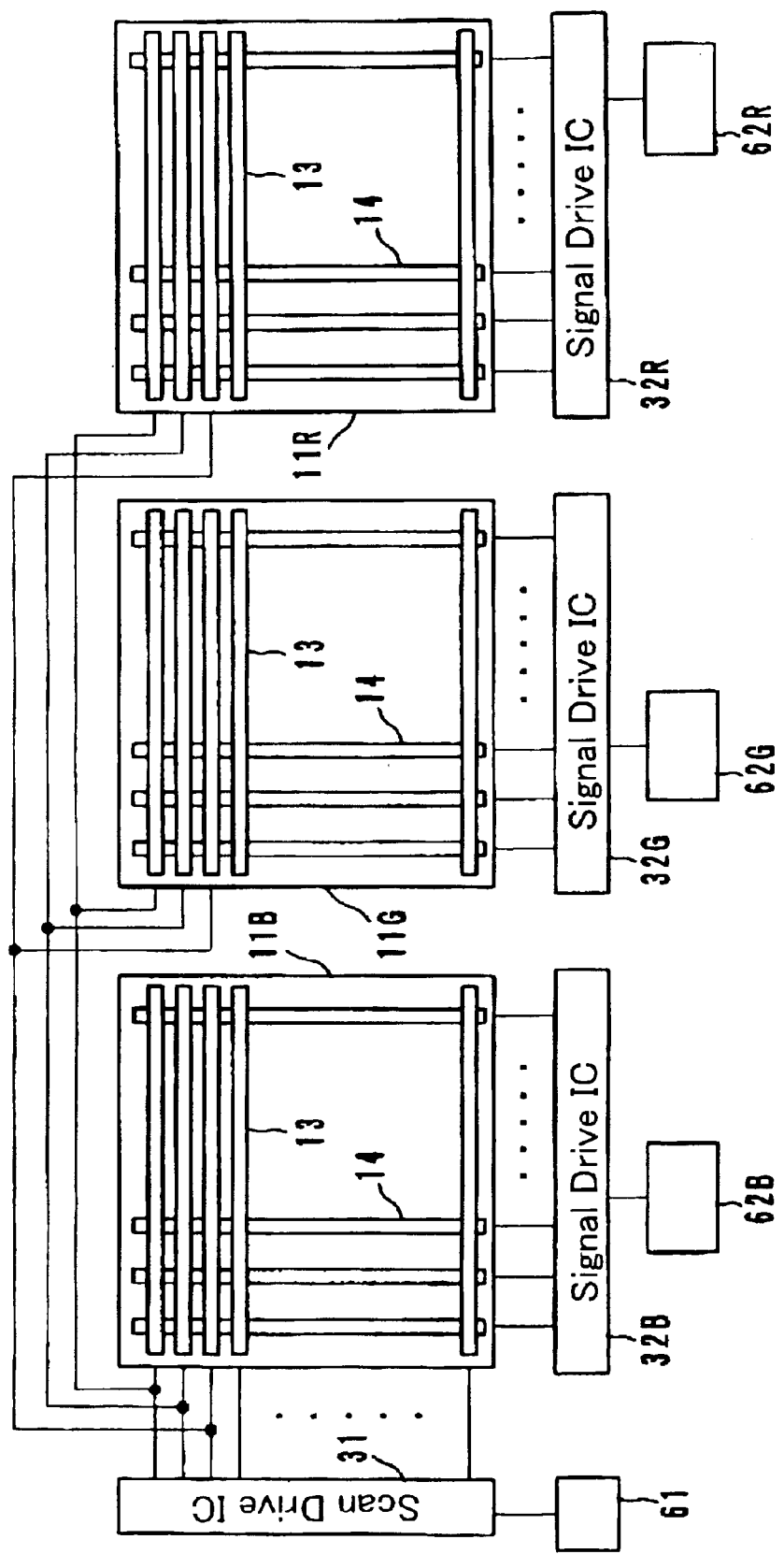
FIG. 11 is a block diagram showing the drive circuit of the liquid crystal display.

Because a liquid crystal display capable of multi-color display comprises B, G and R display layers, three pairs of a scan drive IC and a signal drive IC are ordinarily required. However, for scanning signals, if the medians of the drive voltage ranges are essentially the same for each color (the display layers 11B, 11G and 11R), one scan drive IC 31, as well as the power supply 61, may be shared as shown in FIG. 11. For image data signals, it is necessary to input B, G and R signals independently, and therefore, the display layers 11B, 11G and 11R must have signal drive ICs 32B, 32G and 32R equipped with power supplies 62B, 62G and 62R, respectively.

EXPERIMENT EXAMPLES

The experiment examples evaluated by the inventors will be explained below with reference to the specific materials and manufacturing methods used. The drive voltages shown below are the lowest voltage among the voltage levels that generated the highest Y value for B, G and R liquid crystal cells, respectively, and the highest voltage among the voltage levels that generate the highest Y value for B, G and R liquid crystal cells, respectively, said Y value being measured while a 5 msec pulse voltage was being applied to each liquid crystal cell.

Experiment Example 1

A liquid crystal composition A1 having a selective reflection wavelength of approximately 680 nm, a liquid crystal composition B1 having a selective reflection wavelength of approximately 560 nm, and a liquid crystal composition C1 having a selective reflection wavelength of approximately 480 nm were created by adding a chiral agent (available from Merck Japan Ltd.) to a liquid crystal mixture a1 (dielectric anisotropy $\Delta\epsilon=15$, refractive anisotropy $\Delta n=0.2$, isotropic state transfer temperature $T_{N1}=100°$ C.) including a liquid crystal pyrimidine compound, a liquid crystal mixture b1 ($\Delta\epsilon=17$, $\Delta n=0.17$, $T_{N1}=100°$ C.) including a liquid crystal pyrimidine compound, and a liquid crystal mixture c1 ($\Delta\epsilon=20$, $\Delta n=0.17$, $T_{N1}=100°$ C.) including a liquid crystal ester compound in the amounts of 14%, 20% and 24% by weight, respectively. The dielectric anisotropic values $\Delta\epsilon$ of the liquid crystal compositions A1, B1 and C1 were all 12.

For the substrates, a pair of polyethylene sulfonate (PES) film substrates on which transparent electrodes had been formed were used, a 0.7 $\mu$m-thick insulating film HIM3000 (available from Hitachi Chemical Co., Ltd.) was formed on each set of the electrodes, and an 800 Å-thick orientation control film AL4552 (available from JSR Corp.) was formed on top of the insulating film. The orientation control films were not processed through rubbing. Approximately 7 $\mu$m-diameter spacers were dispersed on the orientation control film on one of the substrates.

A resin material comprising mainly thermoplastic resin was placed on a metal mask having approximately 100 $\mu$m-diameter holes aligned at approximately 500 $\mu$m intervals, and by extruding the resin material by means of a squeegee, screen printing was performed so that approximately 8 $\mu$m-high cylindrical structures were formed on the orientation control film on the other substrate. Subsequently, the liquid crystal composition A1 was supplied to the surface of a substrate having the cylindrical structures, said substrate being placed on a flat panel. The other substrate was placed on top, and the substrates were glued together by means of a pressure roller. After the substrates were heated at 150° C. for one hour, a liquid crystal display cell that performed selective reflection for red was obtained. Using the liquid crystal composition B1 and the liquid crystal composition C1, a liquid crystal display cell for green and a liquid crystal display cell for blue, each of which comprised a liquid crystal layer having the same thickness as the other layers and held between substrates, were created in the same manner.

The three liquid crystal display cells created in this way changed to a colored state when a 60V pulse voltage was applied, and became transparent when a 30V pulse voltage was applied. By stacking these liquid crystal cells in the order of blue, green and red from the observation side, and by placing a alight-absorbing layer that bsorbs visible light on the side of the red liquid crystal display cell opposite the observation side, a layered liquid crystal display capable of multi-color display was obtained.

As described above, where the liquid crystal compositions of the liquid crystal display cells have identical dielectric anisotropic values $\Delta\epsilon$ and identical thicknesses for the insulating films and the orientation films, the threshold voltages to drive the liquid crystal cell could be made identical for all of the liquid crystal display cells by using spacers having the same diameter for each liquid crystal layer, thereby making the thicknesses of the liquid crystal layers uniform.

Experiment Example 2

A liquid crystal composition A2 having a selective reflection wavelength of approximately 680 nm, a liquid crystal composition B2 having a selective reflection wavelength of approximately 560 nm and a liquid crystal composition C2 having a selective reflection wavelength of approximately 480 nm were created by adding S811 chiral agent (available from Merck Japan Ltd.) to a liquid crystal mixture a2 ($\Delta\epsilon=25$, $\Delta n=0.2$, $T_{N1}=100°$ C.) including a liquid crystal ester compound, a liquid crystal mixture b2 ($\Delta\epsilon=17$, $\Delta n=0.16$, $T_{N1}=100°$ C.) including a liquid crystal pyrimidine compound, and a liquid crystal mixture c2 ($\Delta\epsilon=12$, $\Delta n=0.17$, $T_{N1}=100°$ C.) including a liquid crystal cyanobiphenyl compound in the amounts of 14%, 18% and 22% by weight, respectively. The dielectric anisotropic values $\Delta\epsilon$ of the liquid crystal compositions A2, B2 and C2 were 20, 12 and 7, respectively.

Insulating films HIM3000 (available from Hitachi Chemical Co., Ltd.) having thicknesses of 1 $\mu$m, 0.7 $\mu$m and 0.5 $\mu$m respectively were then formed on top of the transparent electrodes on three PES film substrates on which the electrodes had been formed, respectively. An 800 Å-thick orientation control film AL4552 (available from JSR Corp.) was then formed on top of each insulating film. The orientation control films were not processed through rubbing. Approximately 7 $\mu$m-diameter spacers were dispersed on the orientation control films on these substrates. 0.7 $\mu$m-thick insulating films HIM3000 (available from Hitachi Chemical Co., Ltd.) were then formed on top of the transparent electrodes on three PES film substrates on which the electrodes had been formed, respectively. An 800 Å-thick orientation control film AL4552 (available from JSR Corp.) was then formed on top of each insulating film. The orientation control films were not processed through rubbing. A resin material comprising mainly thermoplastic resin was placed on a metal mask having approximately 100 μm-diameter holes aligned at approximately 500 μm intervals, and by extruding the resin material by means of a squeegee, screen printing was performed so that approximately 8 μm-high cylindrical structures were formed on the orientation control films on these substrates.

The liquid crystal composition A2 was then supplied to the surface of one substrate having the cylindrical structures, and this substrate was then placed on a flat panel. A substrate on which a 1 μm-thick insulating film was formed was placed on top of this substrate, and the substrates were glued together by means of a pressure roller. After the substrates were heated at 150° C. for one hour, a liquid crystal display cell that performed selective reflection for red was obtained. Similarly, a liquid crystal display cell for green was created by using the liquid crystal composition B2 and the substrate on which the 0.7 μm-thick insulating film was formed, and a liquid crystal display cell for blue was created by using the liquid crystal composition C2 and the substrate on which the 0.5 μm-thick insulating film was formed.

The three liquid crystal display cells created in this way changed to a colored state when a 60V pulse voltage was applied, and became transparent when a 30V pulse voltage was applied. By stacking these liquid crystal cells in the order of blue, green and red from the observation side, and by placing a light-absorbing layer that absorbs visible light on the side of the red liquid crystal display cell opposite the observation side, a layered liquid crystal display capable of multi-color display was obtained.

As described above, where the liquid crystal display cells have identical thicknesses but their liquid crystal compositions have different dielectric anisotropic values $\Delta\epsilon$, the threshold voltages to drive the liquid crystal cell can be made identical for each of the liquid crystal display cells by adjusting the thickness of the insulating film in each cell, and more preferably, by further reducing the thickness of the insulating film as the dielectric anisotropy $\Delta\epsilon$ decreases.

Experiment Example 3

Liquid crystal display cells were created using the same materials and the same manufacturing method as in the experiment example 2, other than that (i) the thickness of the insulating film was made 0.7 μm for all of the layers, (ii) the thicknesses of the liquid crystal cells for red, green and blue were made 9 μm, 7 μm and 5 μm, respectively, by changing the diameters of the spacers, and (iii) the height of the cylindrical resin structures formed by means of screen printing was made 6 to 10 μm.

As a result, any of the three liquid crystal display cells changed to a colored state when a 60V pulse voltage was applied, and became transparent when a 30V pulse voltage was applied. By stacking these liquid crystal cells in the order of blue, green and red from the observation side, and by placing a light-absorbing layer that absorbs visible light on the side of the red liquid crystal display cell opposite the observation side, a layered liquid crystal display capable of multi-color display was obtained.

As described above, where the liquid crystal display cells have different liquid crystal layer thicknesses but the insulating films have identical thicknesses, the threshold voltages to drive the liquid crystal cell can be made identical for each of the liquid crystal display cells by adjusting the dielectric anisotropy $\Delta\epsilon$ of each liquid crystal composition, and more preferably, by further increasing the dielectric anisotropy $\Delta\epsilon$ as the thickness of the liquid crystal layer increases.

Experiment Example 4

Liquid crystal compositions A1, B1 and C1 that were made in the same manner as in the experiment example 1 and that had a dielectric anisotropy $\Delta\epsilon$ of 12 were used. Insulating films HIM3000 (available from Hitachi Chemical Co., Ltd.) that were 0.5 μm, 0.7 μm and 1 μm thick, respectively, were then formed on the transparent electrodes of three PES film substrates on which the transparent electrodes had been formed. Furthermore, an 800 Å-thick orientation control film AL4552 (available from JSR Corp.) was formed on top of each insulating film. The orientation control films were not processed through rubbing.

In addition, 9 μm-diameter gap controlling spacers were dispersed on the orientation control film on the substrate on which a 0.5 μm-thick insulating film was formed. Similarly, 7 μm-diameter spacers were dispersed on the substrate on which a 0.7 μm-thick insulating film was formed, and 5 μm-diameter spacers were dispersed on the substrate on which a 1 μm-thick insulating film was formed. XN21S sealing material (available from Mitsui Chemical Co., Ltd.) was applied by means of screen printing to the edges of each substrate, while an inlet for the injection of the liquid crystal was left open.

Three PES film substrates on which transparent electrodes were formed were used as the covering substrates. A 0.7 μm-thick insulating film HIM3000 (available from Hitachi Chemical Co., Ltd.) was formed on the electrodes on each covering substrate, and an 800 Å-thick orientation control film AL4552 (available from JSR Corp.) was further formed on the insulating film. The orientation control films were not processed through rubbing.

A covering substrate was placed on the substrate on which a 0.5 μm-thick insulating film was formed, and the substrates were glued together while being pressurized at 150° C. for one hour, whereby a cell having a 9 μm substrate gap distance was created. The liquid crystal composition A1 was then injected through the liquid crystal injection inlet. After the completion of the injection, Photolec A-704-180 (available from Sekisui Finechemical Co., Ltd.) was applied at the injection inlet. 15 mW/cm² UV light was irradiated onto it for five minutes using a high-pressure mercury lamp, whereby a liquid crystal display cell for red was created. Similarly, a liquid crystal display cell for green having a 7 μm-thick liquid crystal layer was created using the liquid crystal composition B1 and the substrate on which the 0.71 μm-thick insulating film was formed, and a liquid crystal display cell for blue having a 5 μm-thick liquid crystal layer was created using the liquid crystal composition C1 and the substrate on which the 1 μm-thick insulating film was formed.

Each of the three liquid crystal display cells changed to a colored state when a 70V pulse voltage was applied, and became transparent when a 35V pulse voltage was applied. By stacking these liquid crystal cells in the order of blue, green and red from the observation side, and by placing a light-absorbing layer that absorbs visible light on the side of the red liquid crystal display cell opposite the observation side, a layered liquid crystal display capable of multi-color display was obtained.

As described above, where the liquid crystal display cells have different liquid crystal layer thicknesses but identical liquid crystal composition dielectric anisotropic values $\Delta\epsilon$, the threshold voltages to drive the liquid crystal cell can be made identical for each of the liquid crystal display cells by adjusting the thickness of the insulating film of each cell, and more preferably, by further reducing the thickness of the insulating film as the thickness of the liquid crystal layer increases.

Experiment Example 5

A liquid crystal composition A5 was created by adding dichroic pigment S1426 (available from Mitsui Chemical Co., Ltd.) that allows light in the red wavelength range to pass through to a liquid crystal mixture a2 ($\Delta\epsilon$=25, $\Delta$n=0.2, $T_{N1}$=100° C.) that includes a liquid crystal ester compound, in the amount of 2% by weight. A liquid crystal composition B5 was created by adding dichroic pigment M-570 (available from Mitsui Chemical Co., Ltd.) that allows light in the blue wavelength range to pass through to a liquid crystal mixture b2 ($\Delta\epsilon$=17, $\Delta$n=0.16, $T_{N1}$=100° C.) that includes a liquid crystal pyrimidine compound, in the amount of 2% by weight. The dielectric anisotropic values $\Delta\epsilon$ of the liquid crystal compositions A5 and B5 were 19 and 12, respectively.

0.7 $\mu$m-thick insulating films HIM3000 (available from Hitachi Chemical Co., Ltd.) were then formed on top of the transparent electrodes on two PES film substrates on which the electrodes had been formed, respectively. An 800 Å-thick orientation control film AL4552 (manufactured by JSR Corp.) was then formed on top of each insulating film. The orientation control films were processed through rubbing. Approximately 7 $\mu$m- and 6 $\mu$m-diameter gap-controlling spacers were dispersed on the orientation control films on these substrates. Sealing material XN21S (available from Mitsui Chemical Co., Ltd.) was then applied by means of screen printing to the edges of each substrate while an inlet for the injection of the liquid crystal was left open.

Two PES film substrates on which transparent electrodes were formed were used as the covering substrates. A 0.7 $\mu$m-thick insulating film HIM3000 (available from Hitachi Chemical Co., Ltd.) was formed on the electrodes on each covering substrate, and an 800 Å-thick orientation control film AL4552 (available from JSR Corp.) was further formed on the insulating film. The orientation control films were processed through rubbing.

A covering substrate was placed on the substrate on which 7 $\mu$m-diameter spacers were dispersed such that the directions of rubbing would be parallel, and the substrates were glued together while being pressurized at 150° C. for one hour, whereupon a cell having a 7 $\mu$m substrate gap distance was created. The liquid crystal composition A5 was then injected through the liquid crystal injection inlet. After the injection was completed, Photolec A-704-180 (available from Sekisui Finechemical Co., Ltd.) was applied at the injection inlet. 15 mW/cm² UV light was irradiated onto it for five minutes using a high-pressure mercury lamp, whereby a liquid crystal display cell for red was created. Similarly, a liquid crystal display cell for blue having a 6 $\mu$m-thick liquid crystal layer was created using the liquid crystal composition B5 and the substrate on which the 6 $\mu$m-diameter spacers were dispersed.

Either of the two liquid crystal display cells changed to a colored state when a 3V pulse voltage was applied, and became transparent when a 0V pulse voltage was applied. By stacking these liquid crystal cells in the order of blue and red from the observation side, and by placing a light-absorbing layer that absorbs visible light on the side opposite the observation side, a layered liquid crystal display capable of displaying red, blue and colors comprising a mixture of blue and red was obtained.

As described above, where the liquid crystal display cells have different liquid crystal composition dielectric anisotropic values $\Delta\epsilon$ but identical thicknesses for the insulating films and the orientation control films, the threshold voltages to drive the liquid crystal cell could be made identical for all of the liquid crystal display cells by adjusting the thickness of each liquid crystal layer, and more preferably, by further reducing the thickness of the liquid crystal layer as the dielectric anisotropy $\Delta\epsilon$ decreases.

Experiment Example 6

Liquid crystal compositions A1, B1 and C1 that were made in the same manner as in the experiment example 1 and that had a dielectric anisotropy $\Delta\epsilon$ of 12 were used. Insulating films HIM3000 (available from Hitachi Chemical Co., Ltd.) that were 0.5 $\mu$m, 0.7 $\mu$m and 1 $\mu$m thick, respectively, were then formed on the transparent electrodes of three PES film substrates on which the transparent electrodes had been formed. Furthermore, an 800 Å-thick orientation control film AL4552 (available from JSR Corp.) was formed on top of each insulating film. The orientation control films were not processed through rubbing.

In addition, 9 $\mu$m-diameter gap controlling spacers were dispersed on the orientation control film on the substrate on which a 0.5 $\mu$m-thick insulating film was formed. Similarly, 7 $\mu$m-diameter spacers were dispersed on the substrate on which a 0.7 $\mu$m-thick insulating film was formed, and 5 $\mu$m-diameter spacers were dispersed on the substrate on which a 1 $\mu$m-thick insulating film was formed. Sealing material XN21S (available from Mitsui Chemical Co., Ltd.) was applied by means of screen printing to the edges of each substrate, while an inlet for the injection of the liquid crystal was left open.

Three PES film substrates on which transparent electrodes were formed were used as the covering substrates. A 0.7 $\mu$m-thick insulating film HIM3000 (available from Hitachi Chemical Co., Ltd.) was formed on the electrodes on each covering substrate, and an 800 Å-thick orientation control film AL4552 (available from JSR Corp.) was further formed on the insulating film. The orientation control films were not processed through rubbing.

A covering substrate was placed on the substrate on which the 9 $\mu$m-diameter spacers were dispersed, and the substrates were glued together while being pressurized at 150° C. for one hour, whereby a cell having a 9 $\mu$m substrate gap distance was created. A mixture comprising the liquid crystal composition A1 and an UV-hardened resin material R684 (available from Nippon Kayaku Co., Ltd.) was then injected through the liquid crystal injection inlet. 10 mW/cm² UV light was irradiated onto the mixture for ten minutes using a high-pressure mercury lamp to induce phase separation, whereby a liquid crystal display cell for red was created. Similarly, a liquid crystal display cell for green having a 7 $\mu$m-thick liquid crystal layer was created using the liquid crystal composition B1 and the substrate on which the 71 $\mu$m-diameter spacers were dispersed, and a liquid crystal display cell for blue having a 5 $\mu$m-thick liquid crystal layer was created using the liquid crystal composition C1 and the substrate on which the 5 $\mu$m-diameter spacers were dispersed.

Each of the three liquid crystal display cells changed to a colored state when a 80V pulse voltage was applied, and became transparent when a 40V pulse voltage was applied. By stacking these liquid crystal cells in the order of blue, green and red from the observation side, and by placing a light-absorbing layer that absorbs visible light on the side of the red liquid crystal display cell opposite the observation side, a layered liquid crystal display capable of multi-color display was obtained.

As described above, where the liquid crystal display cells have different liquid crystal layer thicknesses but identical liquid crystal composition dielectric anisotropic values $\Delta\epsilon$, the threshold voltages to drive the liquid crystal cell can be made identical for each of the liquid crystal display cells by adjusting the thickness of the insulating film of each cell, and more preferably, by further reducing the thickness of the insulating film as the thickness of the liquid crystal layer increases.

Experiment Example 7

Liquid crystal compositions A7, B7 and C7 were created by adding chiral agent S-811 (available from Merck Japan, Inc.) to the liquid crystal compound a2 ($\Delta\epsilon$=14, $\Delta$n=0.23, $T_{N1}$=100° C.) in the amounts of 17%, 22% and 26% by weight, respectively. The liquid crystal compositions A7, B7 and C7 were created such that they would selectively reflect light in the 680 nm, 560 nm and 480 nm wavelength ranges, respectively. The dielectric anisotropic values $\Delta\epsilon$ of the liquid crystal compositions A7, B7 and C7 were 12, 10 and 8, respectively, and their refractive anisotropic values $\Delta$n were 0.2, 0.18 and 0.16, respectively.

An 800 Å-thick orientation control film AL4552 (available from JSR Corp.) was formed on top of each set of the transparent electrodes on PES films (the first substrates), on which the transparent electrodes were formed, and 7 $\mu$m-diameter spacers (available from Sekisui Finechemical Co., Ltd.) were dispersed on the orientation control film. A 2,000 Å-thick insulating film HIM3000 (available from Hitachi Chemical Co., Ltd.) was first formed on each covering PEG film substrate (the second substrate), and an 800 Å-thick orientation control film AL4552 was then formed on the insulating film. Sealing material XN21S (available from Mitsui Chemical Co., Ltd.) was applied by means of screen printing to the edges of each first substrate, such that a sealing wall of a prescribed height was formed.

The liquid crystal compositions A7, B7 and C7 were applied on the first substrates, respectively, and the first and second substrates were glued together using the gluing device. The substrate sets were then heated for one hour at 150° C., whereupon liquid crystal cells for red, green and blue were created. The liquid crystal compositions A7, B7 and C7 were respectively injected into the cells, which all had identical thickness of 7 $\mu$m.

These three cells were stacked in the order of red, green and blue from the observation side, and a black light-absorbing layer was placed at the back side of the layered structure.

When each cell was driven using a prescribed voltage in order to turn them colored or non-colored, the contrast of the layered structure was 2:1 (W/B), and the resulting element turned out to have low contrast because the black display characteristics were particularly poor.

Drive voltages of 85V, 90V and 95V were required to turn the liquid crystal compositions A7, B7 and C7 colored, respectively, while 55V, 60V and 65V drive voltages were required to turn them non-colored, respectively.

Experiment Example 8

Prescribed amounts, i.e., 14%, 20% and 24% by weight, of chiral agent S811 (available from Merck Japan, Inc.) expressed by the chemical formula (C9) was added to a liquid crystal mixture a8 ($\Delta\epsilon$=23, $\Delta$n=0.2, $T_{N1}$=100° C.), a liquid crystal mixture b8 ($\Delta\epsilon$=17, $\Delta$n=0.17, $T_{N1}$=100° C.) and a liquid crystal mixture c8 ($\Delta\epsilon$=11, $\Delta$n=0.17, $T_{N1}$=100° C.), respectively, to create liquid crystal compositions A8, B8 and C8. The liquid crystal compositions A8, B8 and C8 were created such that they would selectively reflect light in the 680 nm, 560 nm and 480 nm wavelength ranges, respectively. The dielectric anisotropy value $\Delta\epsilon$ of the liquid crystal compositions A8, B8 and C8 were 17, 12 and 5, respectively.

Three PES films having transparent electrodes (the first substrates) were prepared, and 2,000 Å-thick red and yellow color filters (available from Fujifilm Olin Co., Ltd.) were formed on top of the electrodes of two of the three substrates, respectively. An 800 Å-thick orientation control film AL4552 (available from JSR Corp.) was then formed on each color filter, and spacers of prescribed sizes were dispersed on the orientation control films. The orientation control films were not processed through rubbing. On the other hand, 2,000 Å-thick insulating films HIM3000 (available from Hitachi Chemical Co., Ltd.) were formed on three other PES films having transparent electrodes (the second substrates), and an 800 Å-thick orientation control film AL4552 was formed on each insulating film. The orientation control films were not processed through rubbing. Ink comprising mainly thermoplastic resin was thereafter placed on a metal mask having approximately 100 $\mu$m-diameter holes aligned at approximately 500 $\mu$m intervals, and by extruding the resin material by means of a squeegee, screen printing was performed so that approximately 5 $\mu$m-high to 10 $\mu$m-high cylindrical high-polymer bodies were formed on each second substrate. Sealing material XN21S (available from Mitsui Chemical Co., Ltd.) was then applied to the edges of the first substrates by means of screen printing to form walls of a prescribed height.

The liquid crystal compositions A8, B8 and C8 were applied on the first substrates, respectively. The first and second substrates were glued together using a gluing device, and the substrates were heated at 150° C. for one hour. The liquid crystal composition A8 was injected into the 9 $\mu$m-thick cell having the first substrate on which the red color filter was formed, the liquid crystal composition B8 was injected into the 71 $\mu$m-thick cell having the first substrate on which the yellow color filter was formed, and the liquid crystal composition C8 was injected into the 5 $\mu$m-thick cell. These three cells were stacked in the order of C8, B8 and A8 from the observation side, with the first substrates on the observation side, and a black light-absorbing film was placed on the back side of the layered structure (the back side of the cell including the liquid crystal composition A8).

The cells were driven using a pulse voltage having a 5 msec pulse width in order to turn them colored (through planar alignment of the molecules) or non-colored (through focal conic alignment of the molecules). A 60V drive voltage was required to turn the liquid crystal compositions A8, B8 and C8 colored, while a 30V drive voltage was required to turn them non-colored.

The drive voltage range was measured by measuring the smallest voltage needed to obtain the colored state having the most intense color and the largest voltage through which the transparent state having the largest degree of transparency was obtained.

Experiment Example 9

Prescribed amounts, i.e., 14%, 20% and 24% by weight, of chiral agent S811 were added to a liquid crystal mixture a9 ($\Delta\epsilon$=24, $\Delta$n=0.21, $T_{N1}$=100° C.), a liquid crystal mixture b9 ($\Delta\epsilon$=18, $\Delta$n=0.17, $T_{N1}$=100° C.) and a liquid crystal mixture c9 ($\Delta\epsilon$=12, $\Delta$n=0.17, $T_{N1}$=100° C.), respectively, to create liquid crystal compositions A9, B9 and C9. The liquid crystal compositions A9, B9 and C9 were created such that they would selectively reflect light in the 680 nm, 560 nm and 480 nm wavelength ranges, respectively. The dielectric anisotropic values $\Delta\epsilon$ of the liquid crystal compositions A9, B9 and C9 were 18, 13 and 6, respectively.

Spacers of prescribed sizes were dispersed on three PES films having an 800 Å-thick orientation control film AL4552 on the transparent electrodes (the first substrates). On the other hand, 2,000 Å-thick insulating films HIM3000 were formed on three other substrates having transparent electrodes, and an 800 Å-thick orientation control film AL4552 was formed on each insulating film. Sealing material XN21S was then applied to the edges of the first substrates by means of screen printing to form walls of a prescribed height.

The liquid crystal compositions A9, B9 and C9 were applied on the first substrates, respectively. The first and second substrates were glued together using a gluing device, and the substrate sets were heated at 150° C. for one hour. The liquid crystal composition A9 was injected into the 91 μm-thick cell, the liquid crystal composition B9 was injected into the 7 μm-thick cell, and the liquid crystal composition C9 was injected into the 5 μm-thick cell, such that liquid crystal display cells for red, green and blue were respectively obtained. These three cells were stacked in the order of blue, green and red from the observation side, and a black light-absorbing film was placed on the back side of the layered structure (the back side of the cell including the liquid crystal composition A9).

When the cells were driven using the same method as in the experiment example 1, a drive voltage of 55V was needed to turn the liquid crystal compositions A9, B9 and C9 colored, while a drive voltage of 30V was required turn them non-colored.

Experiment Example 10

The liquid crystal compositions A9, B9 and C9 shown in the experiment example 2 were used. Spacers of prescribed sizes were dispersed on three PES films on which 800 Å-thick orientation control films AL4552 were formed on top of the transparent electrodes (the first substrates). At the same time, 2,000 Å-thick insulating films HIM3000 were formed on other PES films having transparent electrodes (the second substrates), and an 800 Å-thick orientation control film AL4552 was formed on each insulating film. Subsequently, sealing material XN113E (available from Mitsui Chemical Co., Ltd.) was then applied to the edges of the second substrates by means of screen printing to form walls of a prescribed height. The first and second substrates were glued together and then heated at 150° C. for one hour while a prescribed pressure was applied to them, whereupon three cells were created.

After adding 1.5% of acrylate monomer R684 (available from Nippon Kayaku Co., Ltd.) by weight to each of the liquid crystal compositions A9, B9 and C9, each composition was injected into each cell by means of vacuum injection. The liquid crystal composition A9 was injected into the 9 μm-thick cell, the liquid crystal composition B9 was injected into the 7 μm-thick cell, and the liquid crystal composition C9 was injected into the 5 μm-thick cell. 15 mW/cm² UV light was irradiated onto each cell for five minutes using a high-pressure mercury lamp to form a high-polymer composite film in the liquid crystal layer, whereby a liquid crystal display cell for red including the liquid crystal composition A9, a liquid crystal display cell for green including the liquid crystal composition B9, and a liquid crystal cell for blue including the liquid crystal composition C9 were created. These three cells were stacked in the order of blue, green and red from the observation side, and a black light-absorbing film was placed on the back side of the layered structure (the back side of the cell including the liquid crystal composition A9).

The cells were driven using a pulse voltage having a 5 msec pulse width in order to turn them colored (through planar alignment of the molecules) or non-colored (through focal conic alignment of the molecules). A 55V drive voltage was required to turn the liquid crystal compositions A9, B9 and C9 colored, while a 30V drive voltage was required to turn them non-colored.

Experiment Example 11

This experiment example 11 was constructed as a double-layered liquid crystal display, as shown in FIG. 5. Dichroic pigments SI-426 and M570 (both available from Mitsui Chemical Co.), which absorb the light in the red and blue wavelength ranges, respectively, were added to the liquid crystal mixtures a8 and b8 shown in the experiment example 8 by 2% by weight, respectively, to create liquid crystal compositions A11 and B11. The liquid crystal compositions A11 and B11 were created such that they would absorb light in the 680 nm and 480 nm wavelength ranges, respectively. The dielectric anisotropic values $\Delta\epsilon$ of the liquid crystal compositions A11 and B11 were 17 and 12, respectively.

800 Å-thick orientation control films AL4552 were formed on two PES film substrates on which transparent electrodes had been formed (the first substrates), and spacers of prescribed sizes were dispersed on top of each orientation control film. Sealing material XN21S was applied by means of screen printing to the edges of each substrate to form sealing walls of a prescribed height. On the other hand, 2,000 Å-thick insulating films HIM3000 were formed on two other PES film substrates on which transparent electrodes had been formed (the second substrates), and an 800 Å-thick orientation control film AL4552 was formed on each insulating film.

The liquid crystal compositions A11 and B11 were applied on the first substrates, respectively, and the first and second substrates were glued together using a gluing device. The substrate sets were heated at 150° C. for one hour. The liquid crystal composition A11 was injected into the 7 μm-thick cell and the liquid crystal composition B11 was injected into the 5 μm-thick cell, whereby a liquid crystal display cell for red and a liquid crystal display cell for blue were obtained. These two cells were stacked in the order of blue and red from the observation side, and a light-absorbing film was placed on the back side of the cell including the liquid crystal composition A11, whereby a layered liquid crystal display was obtained.

When the cells were driven, a drive voltage of 3V was required to turn the liquid crystal compositions A11 and B11 colored, while 0V (no voltage application) was required to turn them non-colored.

Experiment Example 12

Prescribed amounts, i.e., 17%, 22% and 26% by weight, of chiral agent S811 (available from Merck Japan, Inc.) were added to a liquid crystal mixture a12 ($\Delta\epsilon$=14, $\Delta$n=0.23, $T_{N1}$=100° C.), respectively, to create liquid crystal compositions A12, B12 and C12. The liquid crystal compositions A12, B12 and C12 were created such that they would selectively reflect light in the 680 nm, 560 nm and 480 nm wavelength ranges, respectively. The dielectric anisotropic values Δε of the liquid crystal compositions A12, B12 and C12 were 12, 10 and 8, respectively. 800 Å-thick orientation control films AL4552 (available from JSR Corp.) were formed on PES film substrates on which transparent electrodes had been formed (the first substrates), and approximately 7 μm-diameter spacers (available from Sekisui Finechemical Co., Ltd.) were dispersed on each orientation control film. 2,000 Å-thick insulating films HIM3000 (available from Hitachi Chemical Co., Ltd.) were formed on covering PES film substrates having transparent electrodes (the second substrates), and an 800 Å-thick orientation control film AL4552 was formed on each insulating film. Sealing material XN21S (available from Mitsui Chemical Co., Ltd.) was then applied by means of screen printing to the edges of each first substrate.

The liquid crystal composition A12 was applied on one first substrate, and this substrate and a second substrate were glued together. The substrate set was heated at 150° C. for one hour, whereupon a liquid crystal display cell for red was created. Similarly, liquid crystal display cells for green and blue were created using the liquid crystal compositions B12 and C12, respectively. The liquid crystal composition A12 was injected into the 9 μm-thick cell, the liquid crystal composition B12 was injected into the 7 μm-thick cell, and the liquid crystal composition C12 was injected into the 5 μm-thick cell.

These three cells were stacked in the order of blue, green and red from the observation side, and a black light-absorbing film was placed on the back side of the red liquid crystal display cell, whereby a layered liquid crystal display was created.

The cells were driven using a pulse voltage having a 5 msec pulse width in order to turn them colored or non-colored. A drive voltage of 90V was required to turn them colored, while a 60V drive voltage was required to turn them non-colored.

Experiment Example 13

A layered liquid crystal display was created by creating liquid crystal display cells for red, green and blue in the same manner as in the experiment example 12, other than that the thicknesses of the liquid crystal layers were all made 7 μm. When the cells were driven using a pulse voltage having a 5 msec pulse width in order to turn them colored or non-colored, the drive voltage needed was 85V to turn the red liquid crystal display cell colored and 55V to turn it non-colored, 90V to turn the green liquid crystal display cell colored and 60V to turn it non-colored, and 95V to turn the blue liquid crystal display cell colored and 65V to turn it non-colored.

Experiment Example 14

Prescribed amounts, i.e., 14%, 20% and 24% by weight, of chiral agent S811 (available from Merck Japan, Inc.) expressed by the chemical formula (C9) shown above was added to (a) a liquid crystal mixture a14 comprising (i) 35% by weight of a liquid crystal phenylcyclohexane compound, (ii) 30% by weight of a liquid crystal ester compound, and (iii) the remainder comprising a P-type 3-ring compound and an N-type 2-ring compound, (b) a liquid crystal mixture b14 comprising (i) 35% by weight of a liquid crystal phenylcyclohexane compound, (ii) 20% by weight of a liquid crystal cyanobiphenyl compound, and (iii) the remainder comprising a liquid crystal terphenyl compound and an N-type 2-ring compound, and (c) a liquid crystal mixture c14 comprising (i) 35% by weight of a liquid crystal tolane compound and (ii) the remainder comprising a liquid crystal pyrimidine compound and an N-type 2-ring compound, to create liquid crystal compositions A14, B14 and C14, respectively. The liquid crystal compositions A14, B14 and C14 were created such that they would selectively reflect light in the 680 nm, 560 nm and 480 nm wavelength ranges, respectively. The dielectric anisotropic values Δε of the liquid crystal compositions A14, B14 and C14 were 17, 12 and 7, respectively, and their refractive anisotropic values Δn were 0.21, 0.14 and 0.14, respectively.

800 Å-thick polyimide orientation control films AL4552 (available from JSR Corp.) were then formed on the transparent electrodes of PES (polyether sulfone) films on which the transparent electrodes had been formed through patterning, such that they comprised the first substrates. The orientation control films were not processed through rubbing. Prescribed amounts of spacers of prescribed sizes were dispersed on the orientation control films of the first substrates. 2,000 Å-thick insulating films HIM3000 (available from Hitachi Chemical Co., Ltd.) were formed on different PES films having transparent electrodes (the second substrates), and an 800 Å-thick orientation control film AL4552 was formed on each insulating film. The orientation control films were not processed through rubbing. Sealing material XN21S (available from Mitsui Chemical Co., Ltd.) was then applied by means of screen printing to the edges of each first substrate to form sealing walls.

The liquid crystal composition A14 was applied onto one first substrate. That first substrate and a second substrate were glued together using a gluing device and heated at 150° C. for one hour, whereupon a liquid crystal display cell for red was obtained. Similarly, other first substrates and second substrates were glued together while using the liquid crystal compositions B14 and C14, respectively, to obtain liquid crystal display cells for green and blue. The liquid crystal composition A14 was injected into the 9 μm-thick cell, the liquid crystal composition B14 was injected into the 7 μm-thick cell and the liquid crystal composition C14 was injected into the 5 μm-thick cell. These three cells were stacked in the order of blue, green and red from the observation side, and a black light-absorbing layer was placed on the back side of the layered structure (the back side of the cell including the liquid crystal composition A14).

When each cell was driven using a pulse voltage having a 5 msec pulse width in order to turn them colored (through planar alignment of the molecules) or non-colored (through focal conic alignment of the molecules), the layered structure had a contrast of 6:1 (W/B), and exhibited very good display characteristics. A drive voltage of 60V was required to turn the liquid crystal compounds A14, B14 and C14 colored, while a 30V drive voltage was required to turn them non-colored.

A spectrophotometer CM-3700 (available from Minolta Co., Ltd.) was used to measure the reflectance, etc., in order to determine the contrast. The same device was also used for the experiment examples and comparison examples described below. The drive voltage range was measured by measuring the smallest voltage needed to obtain the colored state having the most intense color and the largest voltage through which the transparent state having the largest degree of transparency was obtained.

Experiment Example 15

The liquid crystal compositions A14, B14 and C14 described in the experiment example 14 were used. An 800

Å-thick orientation control film AL4552 (available from JSR Corp.) was formed on the electrodes on each of three PES film substrates on which the transparent electrodes had been formed, and spacers of a prescribed size were dispersed on each orientation control film. On the other hand, 2,000 Å-thick insulating films HIM3000 were formed on another three PES films having transparent electrodes (the second substrates), and an 800 Å-thick orientation control film AL4552 was formed on each insulating film. Sealing material XN113E (available from Mitsui Chemical Co., Ltd.) was then applied by means of screen printing on the edges of each second substrate to form sealing walls. The first and second substrates were glued together and heated at 150° C. for one hour while a prescribed pressure was applied to them, whereupon three cells were created.

Acrylate monomer R684 (available from Nippon Kayaku Co., Ltd.) was then added to the liquid crystal compositions A14, B14 and C14 in the amount of 2% by weight for each, and the compositions were injected into each cell by means of vacuum injection. The liquid crystal composition A14 was injected into the 9 μm-thick cell, the liquid crystal composition B14 was injected into the 7 μm-thick cell and the liquid crystal composition C14 was injected into the 5 μm-thick cell. 15 mW/cm$^2$ UV light was irradiated onto each cell for five minutes using a high-pressure mercury lamp to form a high-polymer composite film in the liquid crystal layer, whereby a liquid crystal display cell for red including the liquid crystal composition A14, a liquid crystal display cell for green including the liquid crystal composition B14, and a liquid crystal cell for blue including the liquid crystal composition C14 were created. These three cells were stacked in the order of blue, green and red from the observation side, and a black light-absorbing film was placed on the back side of the layered structure (the back side of the cell including the liquid crystal composition A14).

When each cell was driven using a pulse voltage having a 5 msec pulse width in order to turn them colored (through planar alignment of the molecules) or non-colored (through focal conic alignment of the molecules), the contrast of the layered structure was 4:1 (W/B), and the layered structure exhibited very good display characteristics. A drive voltage of 80V was required to turn the liquid crystal compounds A14, B14 and C14 colored, while a 50V drive voltage was required to turn them non-colored.

Experiment Example 16;

Prescribed amounts, i.e., 14%, 20% and 24% by weight, of a mixture of three parts of chiral agent R811 expressed by the chemical formula (C9) shown above and one part of chiral agent CB15 expressed by the chemical formula (F1) shown above (both available from Merck Japan, Inc.) were added to the liquid crystal mixtures a14, b14 and c14 shown in the experimental example 14, respectively, to create liquid crystal compositions A16, B16 and C16. The liquid crystal compositions A16, B16 and C16 were created such that they would selectively reflect light in the 680 nm, 560 nm and 480 nm wavelength ranges, respectively. The dielectric anisotropic values Δε of the liquid crystal compositions A16, B16 and C16 were 18, 13 and 8, respectively, and their refractive anisotropic values Δn were 0.21, 0.14 and 0.14, respectively.

800 Å-thick polyimide orientation control films (AL4552 available from JSR Corp.) were then formed on the transparent electrodes of PES (polyether sulfone) films on which the transparent electrodes had been formed through patterning, such that they comprised the first substrates. The orientation control films were not processed through rubbing. Spacers of prescribed sizes were dispersed on the orientation control films of the first substrates. 2,000 Å-thick insulating films HIM3000 were formed on different PES films having transparent electrodes (the second substrates), and an 800 Å-thick orientation control film AL4552 was formed on each insulating film. The orientation control films were not processed through rubbing. Ink comprising mainly thermoplastic resin was thereafter placed on a metal mask having approximately 100 μm-diameter holes aligned at approximately 500 μm intervals, and by extruding the resin material by means of a squeegee, screen printing was performed so that approximately 5 μm-high to 10 μm-high cylindrical high-polymer bodies were formed on each second substrate. Sealing material XN21S was then applied to the edges of the first substrates by means of screen printing to form sealing walls.

The liquid crystal composition A16 was applied onto one first substrate. That first substrate and a second substrate were glued together using a gluing device and heated at 150° C. for one hour, whereupon a liquid crystal display cell for red was obtained. Similarly, other first substrates and second substrates were glued together while using the liquid crystal compositions B16 and C16, respectively, to obtain liquid crystal display cells for green and blue.

The liquid crystal composition A16 was injected into the 9 μm-thick cell, the liquid crystal composition B16 was injected into the 7 μm-thick cell, and the liquid crystal composition C16 was injected into the 5 μm-thick cell. These three cells were stacked in the order of blue, green and red from the observation side, and a black light-absorbing layer was placed on the back side of the layered structure (the back side of the cell including the liquid crystal composition A16).

When each cell was driven using the same method as in the experiment example 1, the layered structure had a contrast of 6.5:1 (W/B), and exhibited very good display characteristics. A drive voltage of 55V was required to turn the liquid crystal compounds A16, B16 and C16 colored, while a 30V drive voltage was required to turn them non-colored.

Experiment Example 17

The liquid crystal compositions A14, B14 and C14 shown in the experiment example 14 were used. Three PES films having transparent electrodes (the first substrates) were prepared, and a 2,000 Å-thick red color filter (available from Fujifilm Olin Co., Ltd.) was formed on one of them. A 2,000 Å-thick yellow color filter (available from Fujifilm Olin Co., Ltd.) was formed on another of them, and a 2,000 Å-thick insulating film HIM3000 was formed on the last one. An 800 Å-thick orientation control film AL4552 was then formed on each color filter and the insulating film, and spacers of prescribed sizes were dispersed on the orientation control films. The orientation control films were not processed through rubbing. On the other hand, 2,000 Å-thick insulating films HIM3000 were formed on three other PES films having transparent electrodes (the second substrates), and an 800 Å-thick orientation control film AL4552 was formed on each insulating film. The orientation control films were not processed through rubbing. Ink comprising mainly thermoplastic resin was thereafter placed on a metal mask having approximately 100 μm-diameter holes aligned at approximately 500 μm intervals, and by extruding the resin material by means of a squeegee, screen printing was performed so that approximately 5 μm-high to 10 μm-high cylindrical high-polymer structures were formed on each second substrate. Sealing material XN21S was then applied to the edges of the first substrates by means of screen printing to form sealing walls.

The liquid crystal composition A14 was applied onto one first substrate. That first substrate and a second substrate were glued together using a gluing device and heated at 150° C. for one hour, whereupon a liquid crystal display cell for red was obtained. Similarly, other first substrates and second substrates were glued together while using the liquid crystal compositions B14 and C14, respectively, to obtain liquid crystal display cells for green and blue. The liquid crystal composition A14 was injected into the 9 μm-thick cell, the liquid crystal composition B14 was injected into the 71 μm-thick cell, and the liquid crystal composition C14 was injected into the 5 μm-thick cell. These three cells were stacked in the order of blue, green and red from the observation side, and a black light-absorbing layer was placed on the back side of the layered structure (the back side of the cell including the liquid crystal composition A14).

When each cell was driven using the same method as in the experiment example 14, the layered structure had a contrast of 6:1 (W/B), and exhibited very good display characteristics. A drive voltage of 60V was required to turn the liquid crystal compounds A14, B14 and C14 colored, while a 30V drive voltage was required to turn them non-colored.

Experiment Example 18 chiral agent CB15, chiral agent S811 and chiral agent CM31 expressed by a chemical formula (E9) shown above (available from Chisso Corp.) were added to the liquid crystal mixtures a14, b 14 an c14 shown in the experiment example 14 in the amounts of 20%, 16% and 15% by weight, respectively, to create liquid crystal compositions A18, B18 and C18. The liquid crystal compositions A18, B18 and C18 were created such that they would selectively reflect light in the 680 nm, 560 nm and 480 nm wavelength ranges, respectively. The dielectric anisotropic values Δε of the liquid crystal compositions A18, B18 and C18 were 17, 13 and 13, respectively, and their refractive anisotropic values Δn were 0.18, 0.15 and 0.15, respectively.

Cells were then created using the same construction, materials and method as in the experiment example 14, and liquid crystal compositions A18, B18 and C18 were injected into the cells, respectively, whereupon liquid crystal display cells for red, green and blue were obtained. These three cells had thicknesses of 9 μm, 7 μm and 5 μm, respectively. They were stacked in the order of blue, green and red from the observation side, and a black light-absorbing layer was placed on the back side of the layered structure (the back side of the cell including the liquid crystal composition A18).

When each cell was driven using the same method as in the experiment example 14, the layered structure had a contrast of 5:1 (W/B), and exhibited excellent display characteristics. A drive voltage of 60V was required to turn the liquid crystal compounds A18, B18 and C18 colored, while a 30V drive voltage was required to turn them non-colored.

Experiment example 19

Prescribed amounts, i.e., 14%, 18% and 22% by weight, of chiral agent S811 (available from Merck Japan, Inc.) were added to (a) a liquid crystal mixture a19 comprising (i) 25% by weight of a liquid crystal ester compound, (ii) 30% by weight of a liquid crystal tolane compound, and (iii) the remainder comprising an N-type 3-ring compound and an N-type 2-ring compound, (b) a liquid crystal mixture b19 comprising (i) 30% by weight of a liquid crystal phenylcyclohexane compound, (ii) 15% by weight of a liquid crystal ester compound, and (iii) the remainder comprising an N-type 2-ring compound, and (c) a liquid crystal mixture c19 comprising (i) 35% by weight of a liquid crystal cyanobiphenyl compound, (ii) 16% by weight of a liquid crystal tolane compound, and (iii) the remainder comprising a liquid crystal pyrimidine compound and an N-type 2-ring compound, to create liquid crystal compositions A19, B19 and C19 having selective reflection wavelengths of 680 nm, 560 nm and 480 nm, respectively. The dielectric anisotropic values Δε of the liquid crystal compositions A19, B19 and C19 were 20, 12 and 7, respectively, and their refractive anisotropic values Δn were 0.21, 0.14 and 0.14, respectively.

Insulating films HIM3000 (available from Hitachi Chemical Co., Ltd.) having thicknesses of 0.3 μm, 0.25 μm and 0.21 μm, respectively, were formed on three PES film substrates on which transparent electrodes had been formed. An 800 Å-thick orientation control film AL4552 (available from JSR Corp.) was then formed on each insulating film. The orientation control films were not processed through rubbing. Subsequently, approximately 7 μm-diameter spacers were dispersed on the orientation control films of these substrates.

800 Å-thick orientation control films AL4552 were formed on the transparent electrodes of three PES film substrates on which the transparent electrodes had been formed. The orientation control films were not processed through rubbing. A resin material comprising mainly thermoplastic resin was thereafter placed on a metal mask having approximately 100 μm-diameter holes aligned at approximately 500 μm intervals, and by extruding the resin material by means of a squeegee, screen printing was performed so that approximately 8 μm-high cylindrical high-polymer structures were formed on the orientation control film of each of these substrates.

Subsequently, the liquid crystal composition A19 was applied to the surface of a substrate having the cylindrical structures, the substrate being on a flat panel. The substrate on which the 0.3 μm-thick insulating film was formed was placed on top, and the substrates were glued together by means of a pressure roller. After the substrates were heated at 150° C. for one hour, a liquid crystal display layer for red was obtained. Similarly, a liquid crystal display layer for green was created by using the liquid crystal composition B19 and the substrate on which the 0.25 μm-thick insulating film was formed, and a liquid crystal display layer for blue by using the liquid crystal composition C19 and the substrate on which the 0.2 μm-thick insulating film was formed The three liquid crystal display cells created in this way changed to a colored state when a 60V pulse voltage was applied, and became transparent when a 30V pulse voltage was applied. By stacking these liquid crystal cells in the order of blue, green and red from the observation side, and by placing a light-absorbing layer that absorbs visible light on the side of the red liquid crystal display layer opposite the observation side, a layered liquid crystal display capable of multi-color display was obtained. The contrast of this layered liquid crystal display was very high at 5:1 (W/B).

Experiment Example 20

Prescribed amounts, i.e., 16%, 18% and 20% by weight, of chiral agent S811 were added to (a) a liquid crystal mixture a20 comprising (i) 15% by weight of a liquid crystal phenylcyclohexane compound having an alkyl chain with a carbon number of 4, as well as (ii) 10% by weight of a liquid crystal phenylcyclohexane compound having an alkyl chain with a carbon number of 5, (b) a liquid crystal mixture b20 comprising (i) 15% by weight of a liquid crystal phenylcyclohexane compound having an alkyl chain with a carbon number of 5, as well as (ii) 10% by weight of a liquid crystal phenylcyclohexane compound having an alkyl chain with a carbon number of 6, and (c) a liquid crystal mixture c20 comprising (i) 15% by weight of a liquid crystal phenylcyclohexane compound having an alkyl chain with a carbon number of 6, as well as (ii) 10% by weight of a liquid crystal phenylcyclohexane compound having an alkyl chain with a carbon number of 7, respectively, to create liquid crystal compositions A20, B20 and C20. The liquid crystal compositions A20, B20 and C20 were created such that they would selectively reflect light in the 680 nm, 560 nm and 480 nm wavelength ranges, respectively. The dielectric anisotropic values $\Delta\epsilon$ of the liquid crystal compositions A20, B20 and C20 were 13, 12 and 11, respectively, and their refractive anisotropic values $\Delta n$ were 0.17, 0.16 and 0.15, respectively. The remaining portions of the liquid crystal compositions A20, B20 and C20 comprised a liquid crystal pyrimidine compound and an N-type 2-ring compound.

Cells were then created using the same construction, materials and method as in the experiment example 16, and the liquid crystal compounds A20, B20 and C20 were injected into the cells, respectively, such that liquid crystal display cells for red, green and blue, were obtained. These three cells had thicknesses of 9 μm, 7 μm and 5 μm, respectively. They were stacked in the order of blue, green and red from the observation side, and a black light-absorbing layer was placed on the back side of the layered structure (the back side of the cell containing the liquid crystal compound A20).

When each cell was driven using the same method used in the experiment example 14, the layered structure had a contrast of 5:1 (W/B), and exhibited excellent display characteristics. A drive voltage of 70V was required to turn the liquid crystal compounds A20, B20 and C20 colored, while a 40V drive voltage was required to turn them non-colored.

Experiment Example 21

Liquid crystal compositions A21, B21 and C21 were created by respectively adding chiral agent CB15 by 20% by weight, chiral agent S811 by 16% by weight, and chiral agent CN (all of them available from Merck Japan, Inc.) by 18% by weight to a liquid crystal mixture a21 comprising (i) 15% by weight of a liquid crystal phenylcyclohexane compound having an alkyl chain with a carbon number of 4, (ii) 10% by weight of a liquid crystal phenylcyclohexane compound having an alkyl chain with a carbon number of 6, and (iii) the remainder comprising a P-type 3-ring compound and an N-type 2-ring compound. The liquid crystal compositions A21, B21 and C21 were created such that they would selectively reflect light in the 680 nm, 560 nm and 480 nm wavelength ranges, respectively. The dielectric anisotropic values $\Delta\epsilon$ of the liquid crystal compositions A21, B21 and C21 were 13, 12 and 11, respectively, and their refractive anisotropic values $\Delta n$ were 0.18, 0.16 and 0.16, respectively.

Cells were then created using the same construction, materials and method as in the experiment example 16, and the liquid crystal compounds A21, B21 and C21 were injected into the cells, respectively, such that liquid crystal display cells for red, green and blue were obtained. These three cells had thicknesses of 9 μm, 7 μm and 5 μm, respectively. They were stacked in the order of blue, green and red from the observation side, and a black light-absorbing layer was placed on the back side of the layered structure (the back side of the cell containing the liquid crystal compound A21).

When each cell was driven using the same method used in the experiment example 14, the layered structure had a contrast of 5:1 (W/B), and exhibited very good display characteristics. A drive voltage of 75V was required to turn the liquid crystal compounds A21, B21 and C21 colored, while a 40V drive voltage was required to turn them non-colored.

Experiment Example 22

This experiment example 22 was constructed as a double-layered liquid crystal display, as shown in FIG. 5. Liquid crystal compositions A22 and B22 were created by adding to liquid crystal mixtures a14 and b14 shown in the experiment example 14 dichroic pigments S1426 and M570 (available from Mitsui Chemical Co., Ltd.) that allow light in the red and blue wavelength ranges to pass through, respectively, in the amount of 2% by weight, respectively. The liquid crystal compositions A22 and B22 were created such that they would absorb light in the 680 nm and 480 nm wavelength ranges, respectively. The dielectric anisotropic values $\Delta\epsilon$ of the liquid crystal compositions A22 and B22 were 20 and 15, respectively, and their refractive anisotropic values $\Delta n$ were 0.22 and 0.15, respectively.

800 Å-thick polyimide orientation control films AL4552 (manufactured by JSR Corp.) were then formed on the transparent electrodes of PES films on which the transparent electrodes had been formed through patterning, such that they comprised the first substrates. Spacers of prescribed sizes were dispersed on the orientation control films of the first substrates. At the same time, 2,000 Å-thick insulating films HIM3000 were formed on different PES films having patterned transparent electrodes (the second substrates), and an 800 Å-thick polyimide orientation control film AL4552 was formed on each insulating film. Subsequently, sealing material XN21S was applied by means of screen printing to the edges of each first substrate to form sealing walls of a prescribed height, leaving an injection inlet. The first and second substrates were glued together and heated at 150° C. for one hour while a prescribed pressure was applied to them, whereupon two cells were created.

The liquid crystal compositions A22 and B22 were injected into the cells, respectively, through the injection inlet by means of vacuum injection, to create liquid crystal display cells for red and blue. They had thicknesses of 7 μm and 5 μm, respectively. These two cells were stacked in the order of blue and red from the observation side, and a black light-absorbing layer was placed on the back side of the layered structure (the back side of the cell including the liquid crystal composition A22).

When each cell was driven, the contrast of the layered structure was 4:1, and the layered structure exhibited good display characteristics when both of them were turned colored simultaneously (i.e., when an red image was shown on a blue background). A drive voltage of 3V was required to turn the liquid crystal compositions A22 and B22 colored, while a 0V drive voltage (i.e., no voltage application) was required to turn them non-colored.

Experiment Example 23

Chiral agent S811 (available from Merck Japan, Inc.) was added in the amounts of 15%, 18% and 22% by weight, respectively, to the liquid crystal mixture c19 that was used in the experiment example 19 and comprised (i) 35% by weight of a liquid crystal cyanobiphenyl compound and (ii) 16% by weight of a liquid crystal tolane compound, to create liquid crystal composition A23 having a selective reflection wavelength of approximately 680 nm, a liquid crystal composition B23 having a selective reflection wavelength of approximately 560 nm, and a liquid crystal composition C23 having a selective reflection wavelength of approximately 480 nm. The dielectric anisotropic values $\Delta\epsilon$ of the liquid crystal compositions A23, B23 and C23 were 11, 9 and 7, respectively, and their refractive anisotropic values $\Delta n$ were 0.21, 0.17 and 0.14, respectively.

Three liquid crystal display cells for red, green and blue were then created in the same manner as in the experiment example 19, except that the liquid crystal compositions A23, B23 and C23 were used in place of the liquid crystal compositions A19, B19 and C19, and a layered liquid crystal display was obtained.

As a result, the contrast of the liquid crystal display was low at 2:1 (W/B). The red display layer turned colored when a 80V pulse voltage was applied to it, and became transparent when a 45V pulse voltage was applied. The green display layer turned colored when a 85V pulse voltage was applied to it, and became transparent when a 50V pulse voltage was applied. The blue display layer turned colored when a 90V pulse voltage was applied to it, and became transparent when a 55V pulse voltage was applied.

Experiment Example 24

Prescribed amounts, i.e., 17%, 22% and 26% by weight, of chiral agent S811 (available from Merck Japan, Inc.) was added to a liquid crystal mixture a24 comprising (i) 38% by weight of a liquid crystal tolane compound, (ii) 10% by weight of a liquid crystal phenylcyclohexane compound, and (iii) the remainder comprising a liquid crystal pyrimidine compound and an N-type 2-ring compound, to create liquid crystal compositions A24, B24 and C24, respectively. The liquid crystal compositions A24, B24 and C24 were created such that they would selectively reflect light in the 680 nm, 560 nm and 480 nm wavelength ranges, respectively. The dielectric anisotropic values $\Delta\epsilon$ of the liquid crystal compositions A24, B24 and C24 were 12, 10 and 8, respectively, and their refractive anisotropic values $\Delta n$ were 0.2, 0.18 and 0.16, respectively.

An 800 Å-thick orientation control film AL4552 (available from JSR Corp.) was formed on the electrodes on each of three PES film substrates on which the transparent electrodes had been formed, and 7 $\mu$m-diameter spacers (available from Sekisui Finechemical Co., Ltd.) were dispersed on each orientation control film. On the other hand, 2,000 Å-thick insulating films HIM3000 (available from Hitachi Chemical Co., Ltd.) were formed on three other PES films having transparent electrodes, and an 800 Å-thick orientation control film AL4552 was formed on each insulating film. Sealing material XN21S (available from Mitsui Chemical Co., Ltd.) was then applied by means of screen printing to the edges of each first substrate to form sealing walls.

The liquid crystal compositions A24, B24 and C24 were applied onto the first substrates, respectively. The first and second substrates were then glued together using a gluing device, and heated at 150° C. for one hour, whereupon liquid crystal display cells for red, green and blue were obtained. These three cells were stacked in the order of red, green and blue from the observation side, and a black light-absorbing layer was placed on the back side of the layered structure, whereupon a layered liquid crystal display was obtained.

When each cell was driven using a prescribed voltage in order to turn it colored or non-colored, the contrast of the layered structure was 2:1 (W/B), and the resulting element turned out to have low contrast because the black display characteristics were particularly poor. Drive voltages of 85V, 90V and 95V were required to turn the liquid crystal compositions A24, B24 and C24 colored, respectively, while 55V, 60V and 65V drive voltages were required to turn them non-colored, respectively.

Although the present invention has been fully described by way of examples with reference to the accompanying drawings, it is to be noted that various changes and modifications will be apparent to those skilled in the art. In particular, the specific examples and numerical values of the various components, such as the liquid crystal, are merely examples. In addition, various display drive methods may be used, and the most appropriate one should be adopted. Therefore, unless otherwise such changes and modifications depart from the scope of the present invention, they should be construed as being included therein.

What is claimed is:

1. A liquid crystal display comprising:

a first layer including a first cholesteric liquid crystal mixture; and a second layer including a second cholesteric liquid crystal mixture, wherein the first cholesteric liquid crystal mixture includes a first nematic liquid crystal compound and the second cholesteric liquid crystal mixture includes a second nematic liquid crystal compound, wherein the first nematic liquid crystal compound is different from the second nematic liquid crystal compound, and wherein the first layer and the second layer have a same maximum driving voltage.

2. A liquid crystal display in accordance with claim 1 comprising:

a plurality of layers, said plurality of layers including said first layer and said second layer, wherein each of said plurality of layers includes a respective cholesteric liquid crystal mixture, wherein each respective cholesteric liquid crystal mixture includes a nematic liquid crystal compound, wherein each nematic liquid crystal compound is different, and wherein all of said plurality of layers have the same maximum driving voltage.

3. A liquid crystal display as claimed in claim 1, wherein each of said first and second layers is disposed between substrates.

4. A liquid crystal display as claimed in claim 3, wherein, for each of said first and second layers, respective scan electrodes are provided on one of said substrates and respective signal electrodes are provided on the remaining one of said substrates.

5. A liquid crystal display as claimed in claim 4, wherein signal electrodes that correspond to said first layer are connected to a first signal driver, and the signal electrodes that correspond to said second layer are connected to a second signal driver that is equivalent to said first signal drive IC.

6. A liquid crystal display as claimed in claim 4, wherein the scan electrodes that correspond to said first layer are respectively connected to the scan electrodes that correspond to said second layer.

7. A liquid crystal display as claimed in claim 3, wherein at least one of said substrates is pliable.

8. A liquid crystal display as claimed in claim 3, wherein, for at least one of said first and second layers, a plurality of resin structures for connecting the substrates are provided within a light modulating area.

9. A liquid crystal display as claimed in claim 3, wherein at least one of said first and second layers further includes a network matrix of a polymer material about which the respective liquid crystal mixture is dispersed.

10. A liquid crystal display as claimed in claim 1, further comprising a third layer including a third cholesteric liquid crystal mixture, wherein said first, second, and third layers respectively reflect blue, green, and red light components, and wherein said first, second, and third layers are stacked, from a normal viewing side, in the order of (1) said first layer for reflecting the blue light component, (2) said second layer for reflecting the green light component, and (3) said third layer for reflecting the red light component.

11. A liquid crystal display as claimed in claim 1, wherein said first and second layers have essentially identical minimum drive voltages.

12. A liquid crystal display as claimed in claim 1, wherein each of said first and second layers has at least one respective functional layer, and wherein said respective functional layers have identical thicknesses.

13. A liquid crystal display comprising:

a first layer including a first cholesteric liquid crystal mixture; and a second layer including a second cholesteric liquid crystal mixture, wherein the first cholesteric liquid crystal mixture has a first dielectric anisotropy and the second cholesteric liquid crystal mixture has a second dielectric anisotropy, wherein the first dielectric anisotropy is different from the second dielectric anisotropy, and wherein the first layer and the second layer have a same maximum driving voltage.

14. A liquid crystal display in accordance with claim 13 comprising:

a plurality of layers, said plurality of layers including said first layer and said second layer, wherein each of said plurality of layers includes a respective cholesteric liquid crystal mixture, wherein each respective cholesteric liquid crystal mixture has a dielectric anisotropy, wherein each dielectric anisotropy is different, and wherein all of said plurality of layers have the same maximum driving voltage.

15. A liquid crystal display as claimed in claim 13, wherein each of said first and second layers is disposed between substrates.

16. A liquid crystal display as claimed in claim 15, wherein, for each of said first and second layers, respective scan electrodes are provided on one of said substrates and respective signal electrodes are provided on the remaining one of said substrates.

17. A liquid crystal display as claimed in claim 16, wherein signal electrodes that correspond to said first layer are connected to a first signal driver, and the signal electrodes that correspond to said second layer are connected to a second signal driver that is equivalent to said first signal drive IC.

18. A liquid crystal display as claimed in claim 16, wherein the scan electrodes that correspond to said first layer are respectively connected to the scan electrodes that correspond to said second layer.

19. A liquid crystal display as claimed in claim 15, wherein at least one of said substrates is pliable.

20. A liquid crystal display as claimed in claim 15, wherein, for at least one of said first and second layers, a plurality of resin structures for connecting the substrates are provided within a light modulating area.

21. A liquid crystal display as claimed in claim 15, wherein at least one of said first and second layers further includes a network matrix of a polymer material about which the respective liquid crystal mixture is dispersed.

22. A liquid crystal display as claimed in claim 13, further comprising a third layer including a third cholesteric liquid crystal mixture, wherein said first, second, and third layers respectively reflect blue, green, and red light components, and wherein said first, second, and third layers are stacked, from a normal viewing side, in the order of (1) said first layer for reflecting the blue light component, (2) said second layer for reflecting the green light component, and (3) said third layer for reflecting the red light component.

23. A liquid crystal display as claimed in claim 13, wherein said first and second layers have essentially identical minimum drive voltages.

24. A liquid crystal display as claimed in claim 13, wherein each of said first and second layers has at least one respective functional layer, and wherein said respective functional layers have identical thicknesses.

25. A liquid crystal display as claimed in claim 13, wherein the dielectric anisotropy of said first layer is greater than the dielectric anisotropy of said second layer, and the first layer includes a liquid crystal compound with a polar group.

26. A liquid crystal display as claimed in claim 25, wherein the liquid crystal compound with the polar group is selected from a group consisting of a liquid crystal ester compound, a liquid crystal pyrimidine compound, a liquid crystal cyanobiphenyl compound, a liquid crystal cyanophenylcyclohexane compound, a liquid crystal cyano terphenyl compound, and a liquid crystal difluorostilbene compound.

27. A liquid crystal display comprising:

a first layer having a first thickness and including a first cholesteric liquid crystal mixture; and a second layer having a second thickness and including a second cholesteric liquid crystal mixture, wherein the first cholesteric liquid crystal mixture has a first dielectric anisotropy and the second cholesteric liquid crystal mixture has a second dielectric anisotropy, wherein the first thickness is larger than the second thickness, and wherein the first dielectric anisotropy is larger than the second dielectric anisotropy.

28. A liquid crystal display in accordance with claim 27 comprising:

a plurality of layers, said plurality of layers including said first layer and said second layer, wherein each of said plurality of layers includes a respective cholesteric liquid crystal mixture, wherein each respective cholesteric liquid crystal mixture has a dielectric anisotropy, wherein each dielectric anisotropy is different, wherein each layer has a respective thickness, and wherein, among said plurality of layers, the larger the thickness, the larger the dielectric anisotropy.

29. A liquid crystal display as claimed in claim 28, wherein all of said plurality of layers have thicknesses different from each other.

30. A liquid crystal display as claimed in claim 29, wherein at least two of said plurality of layers are driven with identical drive voltage ranges.

31. A liquid crystal display as claimed in claim 27, wherein each of said first and second layers is disposed between substrates.

32. A liquid crystal display as claimed in claim 31, wherein, for each of said first and second layers, respective scan electrodes are provided on one of said substrates and respective signal electrodes are provided on the remaining one of said substrates.

33. A liquid crystal display as claimed in claim 32, wherein signal electrodes that correspond to said first layer are connected to a first signal driver, and the signal electrodes that correspond to said second layer are connected to a second signal driver that is equivalent to said first signal drive IC.

34. A liquid crystal display as claimed in claim 32, wherein the scan electrodes that correspond to said first layer are respectively connected to the scan electrodes that correspond to said second layer.

35. A liquid crystal display as claimed in claim 31, wherein at least one of said substrates is pliable.

36. A liquid crystal display as claimed in claim 31, wherein, for at least one of said first and second layers, a plurality of resin structures for connecting the substrates are provided within a light modulating area.

37. A liquid crystal display as claimed in claim 31, wherein at least one of said first and second layers further includes a network matrix of a polymer material about which the respective liquid crystal mixture is dispersed.

38. A liquid crystal display as claimed in claim 27, further comprising a third layer including a third cholesteric liquid crystal mixture, wherein said first, second, and third layers respectively reflect blue, green, and red light components, and wherein said first, second, and third layers are stacked, from a normal viewing side, in the order of (1) said first layer for reflecting the blue light component, (2) said second layer for reflecting the green light component, and (3) said third layer for reflecting the red light component.

39. A liquid crystal display as claimed in claim 27, wherein said first and second layers have essentially identical minimum drive voltages.

40. A liquid crystal display as claimed in claim 27, wherein each of said first and second layers has at least one respective functional layer, and wherein said respective functional layers have identical thicknesses.

* * * * *

UNITED STATES PATENT AND TRADEMARK OFFICE
CERTIFICATE OF CORRECTION

PATENT NO.   : 6,781,666 B2
DATED        : August 24, 2004
INVENTOR(S)  : Nobuyuki Kobayshi et al.

It is certified that error appears in the above-identified patent and that said Letters Patent is hereby corrected as shown below:

Column 15,
Please delete figure (B) and add the new figure below

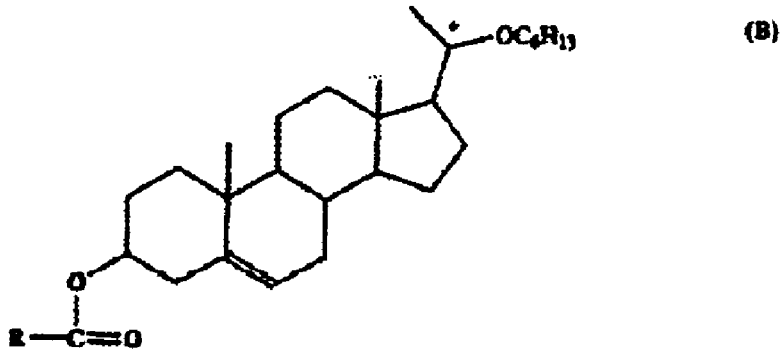

Please delete figure ($B_1$) and add the new Figure ($B_1$) below

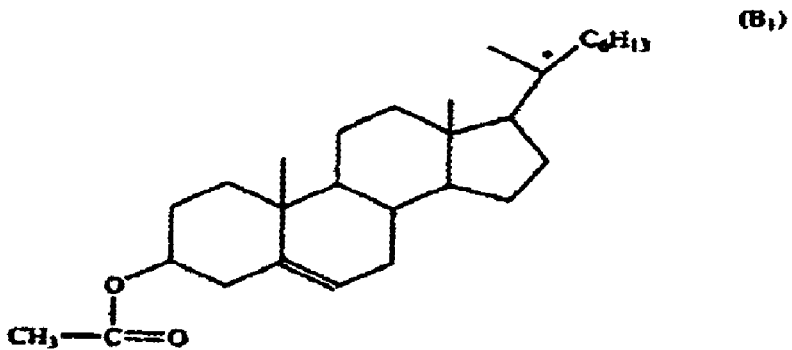

Please delete figure ($B_2$) and add the new figure ($B_2$) below

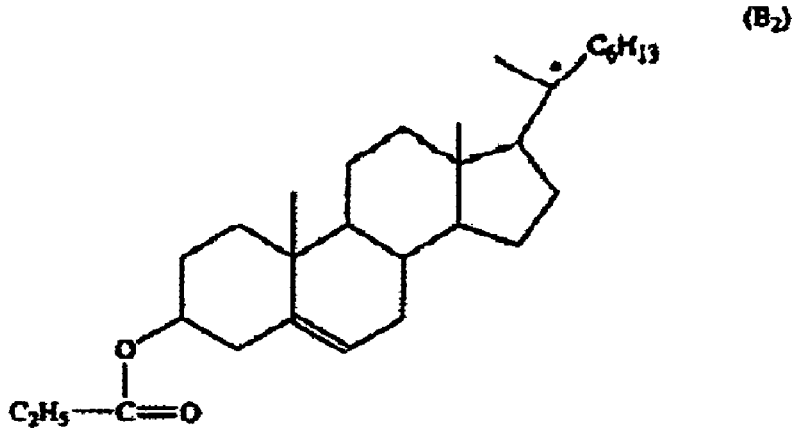

UNITED STATES PATENT AND TRADEMARK OFFICE
CERTIFICATE OF CORRECTION

PATENT NO. : 6,781,666 B2
DATED : August 24, 2004
INVENTOR(S) : Nobuyuki Kobayshi et al.

It is certified that error appears in the above-identified patent and that said Letters Patent is hereby corrected as shown below:

Column 15 (cont'd),
Delete figure ($B_3$) and add the new figure ($B_3$) below

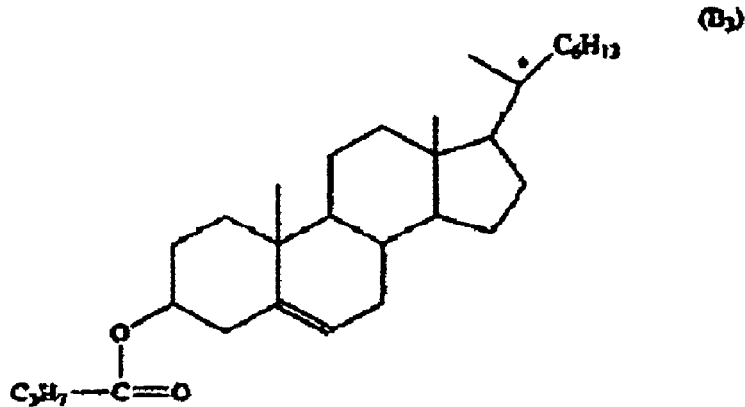

Column 16,
Delete figure ($B_4$) and add the new Figure ($B_4$) below

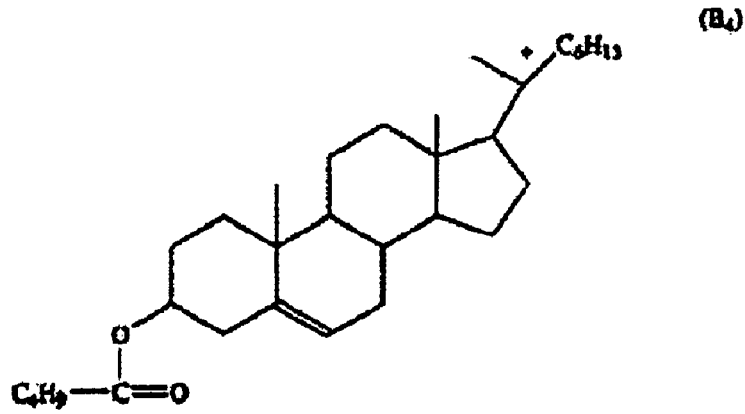

UNITED STATES PATENT AND TRADEMARK OFFICE
CERTIFICATE OF CORRECTION

PATENT NO. : 6,781,666 B2
DATED : August 24, 2004
INVENTOR(S) : Nobuyuki Kobayshi et al.

It is certified that error appears in the above-identified patent and that said Letters Patent is hereby corrected as shown below:

Column 16 (cont'd),
Please delete figure ($B_5$) and add the new figure ($B_5$) below

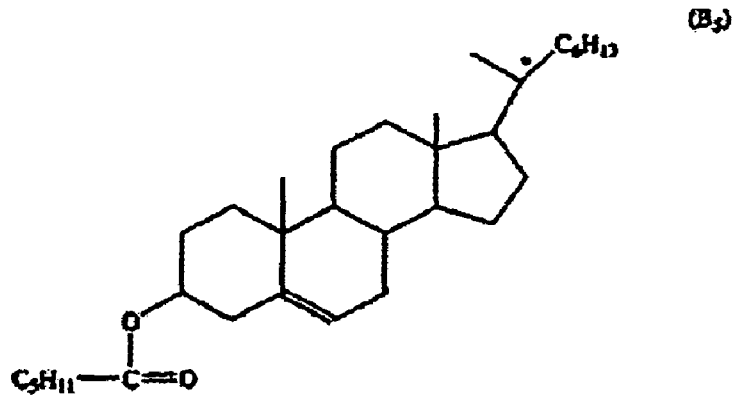

Please delete figure ($B_6$) and add the new Figure ($B_6$) below

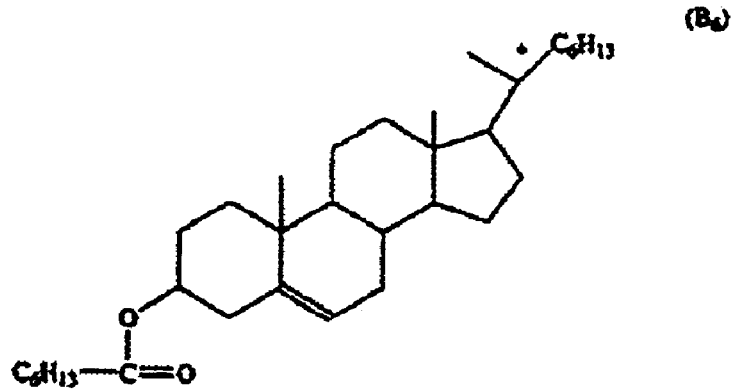

UNITED STATES PATENT AND TRADEMARK OFFICE
CERTIFICATE OF CORRECTION

PATENT NO.   : 6,781,666 B2
DATED        : August 24, 2004
INVENTOR(S)  : Nobuyuki Kobayshi et al.

It is certified that error appears in the above-identified patent and that said Letters Patent is hereby corrected as shown below:

Column 17,
Delete figure ($B_7$) and add the new figure ($B_7$) below

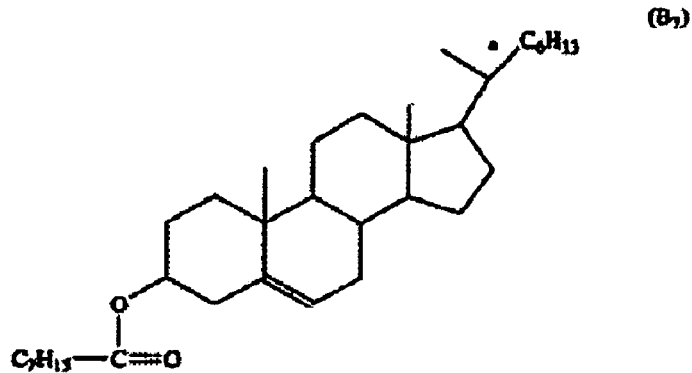

Delete figure ($B_8$) and add the new Figure ($B_8$) below

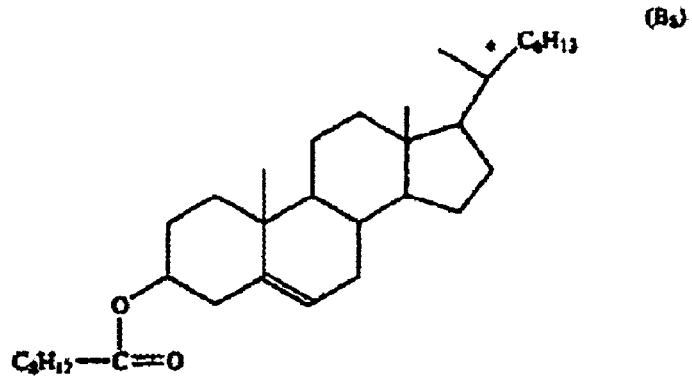

Delete figure ($B_9$) and add figure ($B_9$) below

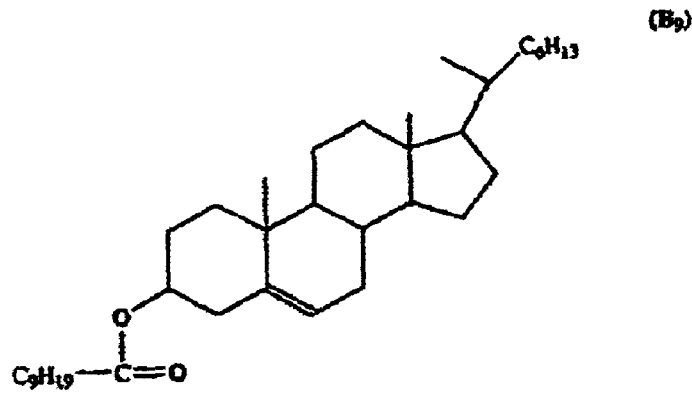

UNITED STATES PATENT AND TRADEMARK OFFICE
CERTIFICATE OF CORRECTION

PATENT NO.    : 6,781,666 B2
DATED         : August 24, 2004
INVENTOR(S)   : Nobuyuki Kobayshi et al.

It is certified that error appears in the above-identified patent and that said Letters Patent is hereby corrected as shown below:

Column 17 (cont'd),
Delete figure ($B_{10}$) and add figure ($B_{10}$) below

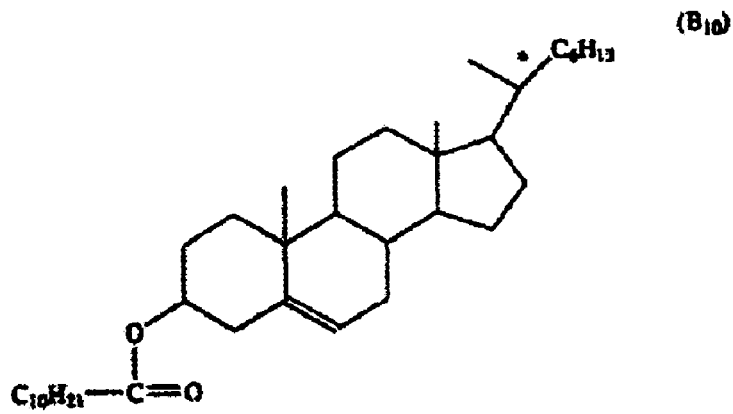

Signed and Sealed this

Twenty-ninth Day of November, 2005

JON W. DUDAS
*Director of the United States Patent and Trademark Office*